United States Patent
Sun et al.

(10) Patent No.: US 10,425,848 B2
(45) Date of Patent: Sep. 24, 2019

(54) METHOD FOR VIRTUAL CARRIER AGGREGATION, BASE STATION, AND USER EQUIPMENT

(71) Applicant: Huawei Technologies Co., Ltd., Shenzhen (CN)

(72) Inventors: Jingyuan Sun, Beijing (CN); Liang Xia, Shenzhen (CN); Yongxing Zhou, Beijing (CN); Xiaotao Ren, Beijing (CN); Mingyu Zhou, Shenzhen (CN); Tao Guo, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 72 days.

(21) Appl. No.: 14/589,686

(22) Filed: Jan. 5, 2015

(65) Prior Publication Data
US 2015/0124638 A1    May 7, 2015

Related U.S. Application Data

(63) Continuation of application No. PCT/CN2012/084019, filed on Nov. 2, 2012.

(30) Foreign Application Priority Data

Jul. 6, 2012  (WO) ............... PCT/CN2012/078300

(51) Int. Cl.
*H04W 24/08* (2009.01)
*H04L 5/00* (2006.01)
(Continued)

(52) U.S. Cl.
CPC ........... *H04W 24/08* (2013.01); *H04L 1/0026* (2013.01); *H04L 1/0027* (2013.01);
(Continued)

(58) Field of Classification Search
CPC .... H04W 24/08; H04L 1/0026; H04L 1/0027; H04L 5/0053; H04L 5/0098
See application file for complete search history.

(56) References Cited

U.S. PATENT DOCUMENTS

2009/0257387 A1* 10/2009 Gholmieh ............. H04L 5/0053
                                                    370/329
2010/0020852 A1*  1/2010 Erell .................... H04L 1/0026
                                                    375/141
(Continued)

FOREIGN PATENT DOCUMENTS

CN        101610537 A     12/2009
CN        101873646 A     10/2010
(Continued)

OTHER PUBLICATIONS

"Rel-10 UE capabilities," 3GPP TSG RAN WG2 Meeting #62, Dublin, Ireland, R2-110496, 3rd Generation Partnership Project, Valbonne, France (Jan. 17-21, 2010).
(Continued)

*Primary Examiner* — Gregory B Sefcheck
*Assistant Examiner* — Jael M Ulysse
(74) *Attorney, Agent, or Firm* — Leydig, Voit & Mayer, Ltd.

(57) ABSTRACT

A method for virtual carrier aggregation, a base station, and a user equipment are provided. A base station receives measurement capability indication information and indication information indicating a capability of receiving data transmission that are reported by a UE. The base station selects a measurement set for the UE according to the measurement capability indication information, and sends the measurement set to the UE, where the indication information indicating the capability of receiving data transmission includes information of carriers on which the UE supports concurrent receiving of data transmission and the measurement capability indication information includes indication information indicating a capability of the UE for measuring CSI and/or indication information indicating a capability of the UE for measuring RSRP. The base station can flexibly select an activated carrier set for the UE.

21 Claims, 5 Drawing Sheets

(51) Int. Cl.
*H04L 1/00* (2006.01)
*H04W 24/10* (2009.01)

(52) U.S. Cl.
CPC .......... *H04L 5/0053* (2013.01); *H04L 5/0098* (2013.01); *H04L 5/001* (2013.01); *H04L 5/006* (2013.01); *H04L 5/0094* (2013.01); *H04W 24/10* (2013.01)

(56) References Cited

U.S. PATENT DOCUMENTS

| | | | |
|---|---|---|---|
| 2010/0118817 A1* | 5/2010 | Damnjanovic | H04L 1/0026 370/329 |
| 2010/0172428 A1* | 7/2010 | Pani | H04L 1/0026 375/262 |
| 2010/0226327 A1* | 9/2010 | Zhang | H04B 7/0632 370/329 |
| 2010/0234037 A1* | 9/2010 | Terry | H04L 1/0023 455/450 |
| 2010/0278058 A1* | 11/2010 | Damnjanovic | H04L 1/0029 370/252 |
| 2010/0329200 A1* | 12/2010 | Chen | H04W 72/042 370/329 |
| 2011/0014922 A1* | 1/2011 | Jen | H04W 74/002 455/450 |
| 2011/0026475 A1* | 2/2011 | Lee | H04L 5/001 370/329 |
| 2011/0058492 A1* | 3/2011 | Ernstrom | H04W 72/1289 370/252 |
| 2011/0170420 A1* | 7/2011 | Xi | H04L 5/001 370/241 |
| 2011/0243012 A1* | 10/2011 | Luo | H04L 5/0055 370/252 |
| 2011/0243015 A1* | 10/2011 | Lim | H04L 1/0026 370/252 |
| 2011/0243066 A1* | 10/2011 | Nayeb Nazar | H04L 1/007 370/328 |
| 2011/0267948 A1 | 11/2011 | Koc et al. | |
| 2011/0269490 A1* | 11/2011 | Earnshaw | H04L 1/0026 455/509 |
| 2011/0305161 A1* | 12/2011 | Ekpenyong | H04L 1/0031 370/252 |
| 2011/0310759 A1* | 12/2011 | Gerstenberger | H04L 5/001 370/252 |
| 2011/0319068 A1* | 12/2011 | Kim | H04L 1/1671 455/422.1 |
| 2012/0039199 A1* | 2/2012 | Chen | H04L 1/0027 370/252 |
| 2012/0039227 A1* | 2/2012 | Chen | H04L 1/0015 370/311 |
| 2012/0039252 A1* | 2/2012 | Damnjanovic | H04L 1/0026 370/328 |
| 2012/0044922 A1* | 2/2012 | Ishii | H04L 5/001 370/338 |
| 2012/0046066 A1* | 2/2012 | Tamura | H04L 1/0029 455/525 |
| 2012/0051451 A1* | 3/2012 | Kwon | H04L 5/0053 375/285 |
| 2012/0076017 A1* | 3/2012 | Luo | H04L 1/0026 370/252 |
| 2012/0113866 A1* | 5/2012 | Tenny | H04W 24/10 370/254 |
| 2012/0113907 A1* | 5/2012 | Baldemair | H04W 52/146 370/329 |
| 2012/0115468 A1* | 5/2012 | Lindoff | H04W 36/06 455/434 |
| 2012/0140708 A1* | 6/2012 | Choudhury | H04W 72/082 370/328 |
| 2012/0147831 A1* | 6/2012 | Golitschek | H04L 1/0026 370/329 |
| 2012/0155312 A1* | 6/2012 | Kim | H04W 24/10 370/252 |
| 2012/0176947 A1* | 7/2012 | Xi | H04L 1/0026 370/311 |
| 2012/0243429 A1 | 9/2012 | Nakamori et al. | |
| 2012/0250558 A1* | 10/2012 | Chung | H04L 1/0026 370/252 |
| 2012/0257513 A1* | 10/2012 | Yamada | H04L 1/0618 370/248 |
| 2012/0287869 A1* | 11/2012 | Xi | H04L 5/003 370/329 |
| 2013/0016639 A1* | 1/2013 | Xu | H04L 5/001 370/311 |
| 2013/0089043 A1* | 4/2013 | Lunttila | H04L 1/0027 370/329 |
| 2013/0215736 A1 | 8/2013 | Han et al. | |
| 2013/0223272 A1 | 8/2013 | Tao et al. | |
| 2013/0322358 A1* | 12/2013 | He | H04W 72/0406 370/329 |
| 2015/0124638 A1 | 5/2015 | Sun et al. | |

FOREIGN PATENT DOCUMENTS

| | | |
|---|---|---|
| CN | 101998420 A | 3/2011 |
| CN | 102244891 A | 11/2011 |
| CN | 102291223 A | 12/2011 |
| CN | 102448107 A | 5/2012 |
| CN | 103636253 A | 3/2014 |
| EP | 2242300 A1 | 10/2010 |
| EP | 2741440 A1 | 6/2014 |
| JP | 2012015992 A | 1/2012 |
| WO | WO 2008116027 A2 | 9/2008 |
| WO | WO 2011043394 A1 | 4/2011 |
| WO | WO 2011139462 A2 | 11/2011 |

OTHER PUBLICATIONS

"Management of CoMP Measurement Set," 3GPP TSG RAN WG1 Meeting #68, Dresden, Germany, R1-120437, 3rd Generation Partnership Project, Valbonne, France (Feb. 6-10, 2012).

"Downlink control Signaling for CoMP," 3GPP TSG RAN WG1 #69, Prague, Czech Republic, R1-122242, 3rd Generation Partnership Project Valbonne, France (May 21-25, 2015).

"Consideration on CSI-RS based RSRP measurement," 3GPP TSG RAN WG1 Meeting #69, Prague, Czech Republic, R1-122041, 3rd Generation Partnership Project, Valbonne, France (May 21-25, 2015).

"CSI-RS configuration details," 3GPP TSG RAN WG1 Meeting #67, San Francisco, California, R1-113809, 3rd Generation Partnership Project, Valbonne, France (Nov. 14-18, 2011).

"LS on Timing Requirements for Activation and Deactivation of SCells," 3GPP TSG RAN WG1 Meeting #63, Jacksonville, Florida, R1-105829 (Nov. 15-19, 2010).

"CoMP Measurement Set Management," 3GPP TSG RAN WG1 Meeting #68, Dresden, Germany, R1-120226 (Feb. 6-10, 2012).

"System Analysis of UE Measurement Capability on frequency adjacent to intra-frequency," 3GPP TSG-RAN WG2 Meeting #64, Prague, Czech Republic, R2-086369 (Nov. 10-14, 2008).

"Further discussion on mobility measurement in CA," 3GPP TSG-RAN WG4 Meeting #55, Montreal, Quebec, Canada, R4-101727 (May 10-14, 2010).

"Inter-frequency Measurement Requirements on Non-Configured Frequencies without Measurement Gaps," 3GPP TSG RAN WG4 Meeting #60bis, R4-115024 (Oct. 10-14, 2011).

* cited by examiner

METHOD FOR VIRTUAL CARRIER AGGREGATION, BASE STATION, AND USER EQUIPMENT

CROSS-REFERENCE TO RELATED APPLICATIONS

This application is a continuation of International Patent Application No. PCT/CN2012/084019, filed on Nov. 2, 2012, which claims priority to International Application No. PCT/CN2012/078300, filed on Jul. 6, 2012, both of which are hereby incorporated by reference in their entireties.

TECHNICAL FIELD

The present invention relates to communication technologies, and in particular, to a method for virtual carrier aggregation (VCA for short below), a base station, and a user equipment.

BACKGROUND

In the 3rd Generation Partnership Project (3GPP for short below), a carrier aggregation (CA for short below) technology is introduced, which means communication between a base station and a user equipment (UE for short below) may be implemented on at least two aggregated component carriers (CC for short below).

In a case where a CA technology is introduced, a UE needs to report uplink and downlink capabilities of the UE to a base station, where the uplink and downlink capabilities of the UE include a combination of frequency bands at which the UE concurrently supports transmission or reception of data.

The base station configures a carrier set for the UE according to the uplink and downlink capabilities reported by the UE. The UE measures and feeds back, on each carrier in the carrier set configured by the base station, reference signal received power (RSRP for short below)/reference signal received quality (RSRQ for short below), and the like. Further, the base station may also configure activation or deactivation of a supplementary carrier for the UE (a primary carrier of the UE is always activated); the UE measures channel state information (CSI for short below) on each carrier in an activated carrier set (including the primary carrier and an activated supplementary carrier), and receives, according to a received physical downlink control channel (PDCCH for short below), a physical downlink shared channel (PDSCH for short below) on a part or all carriers in the activated carrier set.

In the prior art, the base station can only select an activated carrier set for the UE according to long term statistics information RSRP/RSRQ fed back by the UE, and therefore the manner of selecting an activated carrier set by the base station for the UE is not flexible enough.

SUMMARY

The present invention provides a method for virtual carrier aggregation, a base station, and a user equipment, so that the base station flexibly selects an activated carrier set for the UE.

A first aspect of the present invention provides a method for virtual carrier aggregation, including:

receiving, by a base station, measurement capability indication information and indication information indicating a capability of receiving data transmission that are reported by a user equipment;

selecting, by the base station, a measurement set for the user equipment according to the measurement capability indication information; and notifying, by the base station, the measurement set to the user equipment;

where the indication information indicating the capability of receiving data transmission includes information of carriers on which the user equipment supports concurrent receiving of data transmission, and the measurement capability indication information includes indication information indicating a capability of the user equipment for measuring channel state information CSI and/or indication information indicating a capability of the user equipment for measuring reference signal received power RSRP.

A second aspect of the present invention provides a method for virtual carrier aggregation, including:

reporting, by a user equipment, measurement capability indication information and indication information indicating a capability of receiving data transmission to a base station; and receiving, by the user equipment, a measurement set notified by the base station, where the measurement set is selected by the base station for the user equipment according to the measurement capability indication information;

where the indication information indicating the capability of receiving data transmission includes information of carriers on which the user equipment supports concurrent receiving of data transmission, and the measurement capability indication information includes indication information indicating a capability of the user equipment for measuring channel state information CSI and/or indication information indicating a capability of the user equipment for measuring reference signal received power RSRP.

A third aspect of the present invention provides a base station, including:

a receiver, configured to receive measurement capability indication information and indication information indicating a capability of receiving data transmission that are reported by a user equipment, and send the measurement capability indication information to a processor;

the processor, configured to receive the measurement capability indication information from the receiver, select a measurement set for the user equipment according to the measurement capability indication information, and send the measurement set to a transmitter; and the transmitter, configured to obtain the measurement set from the processor, and notify the measurement set to the user equipment;

where the indication information indicating the capability of receiving data transmission includes information of carriers on which the user equipment supports concurrent receiving of data transmission, and the measurement capability indication information includes indication information indicating a capability of the user equipment for measuring channel state information CSI and/or indication information indicating a capability of the user equipment for measuring reference signal received power RSRP.

A fourth aspect of the present invention provides a user equipment, including:

a transmitter, configured to report measurement capability indication information and indication information indicating a capability of receiving data transmission to a base station; and a receiver, configured to receive a measurement set notified by the base station, where the measurement set is selected by the base station for the user equipment according to the measurement capability indication information;

where the indication information indicating the capability of receiving data transmission includes information of carriers on which the user equipment supports concurrent receiving of data transmission, and the measurement capability indication information includes indication information indicating a capability of the user equipment for measuring channel state information CSI and/or indication information indicating a capability of the user equipment for measuring reference signal received power RSRP.

The embodiments of the present invention bring about the following technical effects: A base station receives measurement capability indication information and indication information indicating a capability of receiving data transmission that are reported by a user equipment, selects a measurement set for the user equipment according to the measurement capability indication information, and notifies the selected measurement set to the user equipment, where the measurement capability indication information includes indication information indicating a capability of the user equipment for measuring CSI and/or indication information indicating a capability of the user equipment for measuring RSRP. Then, the base station can receive the channel state information and/or the RSRP reported by the user equipment, select a CSI measurement set for the user equipment, and select, from the CSI measurement set, an activated carrier set for the user equipment. In this way, the base station can flexibly select an activated carrier set for the UE.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
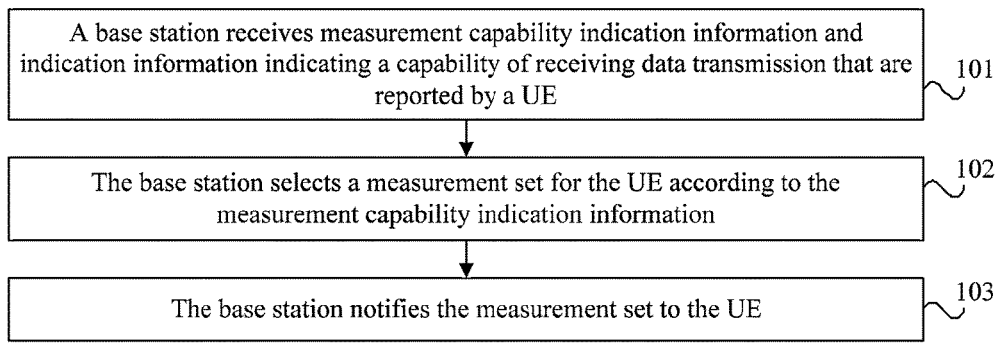
FIG. 1 is a flowchart of an embodiment of a method for virtual carrier aggregation according to the present invention.

FIG. 1 is a flowchart of an embodiment of a method for virtual carrier aggregation according to the present invention. As shown in FIG. 1, the method for virtual carrier aggregation may include:

Step 101: A base station receives measurement capability indication information and indication information indicating a capability of receiving data transmission that are reported by a UE.

Step 102: The base station selects a measurement set for the UE according to the measurement capability indication information.

Step 103: The base station notifies the measurement set to the UE.

The indication information indicating the capability of receiving data transmission includes information of carriers on which the UE supports concurrent receiving of data transmission, and the measurement capability indication information includes indication information indicating a capability of the UE for measuring CSI and/or indication information indicating a capability of the UE for measuring RSRP.

In this embodiment, when the measurement capability indication information is the indication information indicating the capability of the UE for measuring CSI, the number of carriers on which the UE supports CSI measurement is greater than the number of carriers on which the UE supports concurrent receiving of data transmission, and/or, the number of carriers on which the UE supports concurrent CSI measurement is greater than the number of carriers on which the UE supports concurrent receiving of data transmission.

In the foregoing embodiment, a base station receives measurement capability indication information and indication information indicating a capability of receiving data transmission that are reported by a UE, selects a measurement set for the UE according to the measurement capability indication information, and notifies the selected measurement set to the UE, where the measurement capability indication information includes indication information indicating a capability of the UE for measuring CSI and/or indication information indicating a capability of the UE for measuring RSRP. Then, the base station can receive the channel state information and/or the RSRP reported by the UE, select a CSI measurement set for the UE, and select, from the CSI measurement set, an activated carrier set for the UE. In this way, the base station can flexibly select an activated carrier set for the UE.

Figure 2:
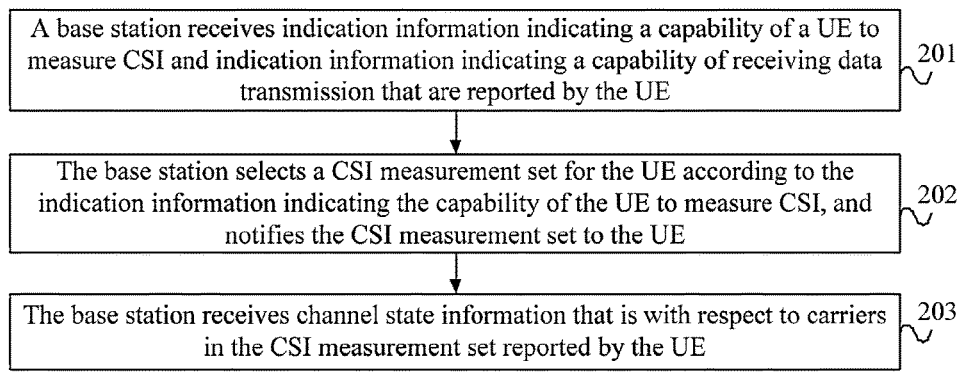
FIG. 2 is a flowchart of another embodiment of a method for virtual carrier aggregation according to the present invention.

FIG. 2 is a flowchart of another embodiment of a method for virtual carrier aggregation according to the present invention. In this embodiment, the specific implementation of the method provided in the embodiment shown in FIG. 1 is described in a scenario where the measurement capability indication information is the indication information indicating the capability of the UE for measuring CSI and the measurement set is a CSI measurement set.

As shown in FIG. 2, the method for virtual carrier aggregation may include:

Step 201: A base station receives indication information indicating a capability of a UE for measuring CSI and indication information indicating a capability of receiving data transmission that are reported by the UE.

The indication information indicating the capability of receiving data transmission includes information of carriers on which the UE supports concurrent receiving of data transmission.

Specifically, the receiving, by a base station, indication information indicating a capability of a UE for measuring CSI that is reported by the UE may be as follows: The base station receives a type of the UE reported by the UE, where the type of the UE pre-defines the capability of the UE for measuring CSI; or, the base station may also receive the capability of the UE for measuring CSI and directly reported by the UE. The CSI includes a channel quality indicator (CQI for short below), a precoding matrix indicator (PMI for short below) and/or a rank indicator (RI for short below).

Specifically, the capability of the UE for measuring CSI may be as follows: the number of carriers on which the UE supports CSI measurement, and/or, the number of carriers on which the UE supports concurrent CSI measurement; or, the capability of the UE for measuring CSI may be as follows: one or all of the number of carriers on which the UE supports CSI measurement and the number of carriers on which the UE supports concurrent CSI measurement, and the number of CSI measurements performed on each carrier on which the UE supports CSI measurement; or, the capability of the UE for measuring CSI may be as follows: one or all of the number of carriers on which the UE supports CSI measurement and the number of carriers on which the UE supports concurrent CSI measurement, and the total quantity of CSI measurements performed by the UE on all carriers on which the UE performs CSI measurement; or, the capability of the UE for measuring CSI may be as follows: one or all of a combination of carriers on which the UE supports CSI measurements and a combination of carriers on which the UE supports concurrent CSI measurement, and the number of CSI measurements performed by the UE on each carrier on which the UE performs CSI measurement; or, the capability of the UE for measuring CSI may be as follows: one or all of a combination of carriers on which the UE supports CSI measurement and a combination of carriers on which the UE supports concurrent CSI measurement, and the total quantity of CSI measurements performed by the UE on all carriers on which the UE performs CSI measurement.

Alternatively, the capability of the UE for measuring CSI may be as follows: the number of carriers on which the UE supports CSI measurement, and/or, the number of carriers on which the UE supports concurrent CSI measurement; or, the capability of the UE for measuring CSI may be as follows: one or all of the number of carriers on which the UE supports CSI measurement and the number of carriers on which the UE supports concurrent CSI measurement, and the number of CSI measurements performed on each carrier on which the UE supports CSI measurement; or, the capability of the UE for measuring CSI may be as follows: one or all of the number of carriers on which the UE supports CSI measurement and the number of carriers on which the UE supports concurrent CSI measurement, and the total quantity of CSI measurements performed on all carriers on which the UE supports CSI measurement; or, the capability of the UE for measuring CSI may be as follows: one or all of a combination of carriers on which the UE supports CSI measurement and a combination of carriers on which the UE supports concurrent CSI measurement, and the number of CSI measurements performed on each carrier on which the UE supports CSI measurement; or, the capability of the UE for measuring CSI may be as follows: one or all of a combination of carriers on which the UE supports CSI measurement and a combination of carriers on which the UE supports concurrent CSI measurement, and the total quantity of CSI measurements performed on all carriers on which the UE supports CSI measurement.

The number of CSI measurements performed on each carrier on which the UE supports CSI measurement may be the same or different. For example, the number of carriers on which the UE supports CSI measurement or the number of carriers on which the UE supports concurrent CSI measurement may be 5, namely, CC1 to CC5 respectively; the number of CSI measurements on each carrier on which the UE performs CSI measurement may be 2, 3, 2, 3, and 2 respectively, or the number of CSI measurements performed on each carrier on which the UE performs CSI measurement may be 2, or the total quantity of CSI measurements performed by the UE on the foregoing five carriers is 10. Specifically, when the number of CSI measurements performed on each carrier on which the UE supports CSI measurement is the same, the UE may report only one corresponding parameter value, for example, 2, and does not need to report the number of CSI measurements performed on each carrier on which the UE performs CSI measurement.

In this embodiment, no matter how the UE reports the capability of the UE for measuring CSI, the number of carriers on which the UE supports CSI measurement is always required to be greater than the number of carriers on which the UE supports concurrent receiving of data transmission, and/or, the number of carriers on which the UE supports concurrent CSI measurement is always required to be greater than the number of carriers on which the UE supports concurrent receiving of data transmission. For example, one UE can concurrently receive data transmission on two carriers of 10 MHz, but may perform CSI measurement on five carriers of 10 MHz concurrently.

In particular, for an enhanced or updated UE category 8 (UE category 8), if the number of carriers on which the UE supports concurrent receiving of data transmission is 5, the number of carriers on which this type of UE supports CSI measurement or the number of carriers on which this type of UE supports concurrent CSI measurement is greater than 5.

Step 202: The base station selects a CSI measurement set for the UE according to the indication information indicating the capability of the UE for measuring CSI, and notifies the CSI measurement set to the UE.

The CSI measurement set includes a set of carriers on which the UE performs CSI measurement or the CSI measurement set includes a set of carriers on which the UE performs CSI measurement and information of a reference signal used to perform CSI measurement on each carrier on which the UE performs CSI measurement.

In a system that uses a CA technology, the CSI measurement set is a set of carriers on which the UE performs CSI measurement. In a system that uses a combination of the CA technology and a coordinated multiple point transmission and reception (Coordinated Multiple Point transmission and reception, CoMP for short below) technology, the CSI measurement set includes a set of carriers on which the UE performs CSI measurement and information of a reference signal used to perform CSI measurement on each carrier on which the UE performs CSI measurement, where the reference signal may be a channel state information reference signal (CSI-RS for short below) and/or a cell-specific reference signal (CRS for short below). The CSI-RS may be notified by using CSI-RS resource configuration information or a CSI-RS number, and the CRS may be notified by using a cell ID.

In this embodiment, the base station may notify the CSI measurement set to the UE by using semi-static signaling or dynamic signaling.

For example, in the system that uses the CA technology, the base station may notify, by using semi-static signaling or dynamic signaling, the set of carriers on which the UE performs CSI measurement to the UE, for example, the set of carriers on which the UE performs CSI measurement includes five carriers {CC1, CC2, CC3, CC4, CC5}.

In the system that uses a combination of the CA technology and the CoMP technology, the base station may notify, by using semi-static signaling or dynamic signaling, the set of carriers on which the UE performs CSI measurement and the information of a reference signal used to perform CSI measurement on each carrier on which the UE performs CSI measurement to the UE. In this embodiment, in the CSI measurement set, the reference signal used to perform CSI measurement on each carrier on which the UE performs CSI measurement may be configured in an independent manner or in a combined manner.

For example, the base station may notify, by using semi-static signaling or dynamic signaling, the UE that the set of carriers on which the UE performs CSI measurement includes five carriers {CC1, CC2, CC3, CC4, CC5}; when the reference signal used to perform CSI measurement on each carrier on which the UE performs CSI measurement are configured in an independent manner, the base station may notify the UE that reference signal in CC1 and used to measure CSI are CSI-RS1 and CSI-RS2, a reference signal in CC2 and used to measure CSI are CSI-RS3, reference signals in CC3 and used to measure CSI are CSI-RS4, CSI-RS5, or CSI-RS6, a reference signal in CC4 and used to measure CSI is CSI-RS7 and CSI-RS8, and a reference signal in CC5 and used to measure CSI is CRS. Each CSI-RS has different parameter configurations.

When the reference signal used to perform CSI measurement on each carrier on which the UE performs CSI measurement is configured in a combined manner, the base station may notify the UE that two CSI-RSs are used on each of the five carriers {CC1, CC2, CC3, CC4, CC5} to perform CSI measurement, and each CSI-RS has same parameter configurations on different carriers.

The parameter configurations of the CSI-RS include a pilot sequence, a pilot pattern and/or a subframe configuration of the CSI-RS, and the like.

In the system that uses a combination of the CA technology and the CoMP technology, the CSI measurement set notified by the base station to the UE by using semi-static signaling or dynamic signaling includes information of a reference signal used to perform CSI measurement on each carrier on which the UE performs CSI measurement. In this way, on each carrier on which the UE performs CSI measurement, the UE needs to measure at least one piece of CSI, where each CSI corresponds to one CoMP manner of transmitting data to the UE under the carrier.

Step 203: The base station receives channel state information that is with respect to carriers in the CSI measurement set and reported by the UE.

In this embodiment, after the base station notifies the CSI measurement set to the UE, the base station may select, from the CSI measurement set, an activated carrier set for the UE, and notifies the activated carrier set to the UE by using semi-static signaling or dynamic signaling. The number of carriers in the activated carrier set is less than or equal to the number of carriers on which the UE supports concurrent receiving of data transmission.

In this embodiment, the number of CCs in the CSI measurement set is greater than the number of carriers in the activated carrier set. With respect to carriers which are included both in the CSI measurement set and in the activated carrier set, the UE measures CSI of a corresponding carrier on the corresponding carrier, and receives a downlink channel on the corresponding carrier; with respect to carriers which are included in the CSI measurement set but are excluded in the activated carrier set, the UE measures CSI of a corresponding carrier on the corresponding carrier, but does not receive a downlink channel on the corresponding carrier.

In the foregoing embodiment, a base station receives indication information indicating a capability of a UE for measuring CSI and indication information indicating a capability of receiving data transmission that are reported by the UE, selects a CSI measurement set for the UE according to the indication information indicating the capability of the UE for measuring CSI, and notifies the selected CSI measurement set to the UE. Then, the base station can receive channel state information, reported by the UE, of carriers in the CSI measurement set, and select an activated carrier set for the UE. In this way, the base station can flexibly select an activated carrier set for the UE.

The following describes manners used by the UE to report the indication information indicating the capability of the UE for measuring CSI in step 201 in the embodiment shown in FIG. 2 of the present invention.

Manner 1: The UE reports a combination of frequency bands at which the UE supports CSI measurement (for example, CSISupportedBandCombination) to the base station, where the combination of frequency bands at which the UE supports CSI measurement includes at least one frequency band combination parameter used for CSI measurement (for example, CSIBandCombinationParameters), and each frequency band combination parameter used for CSI measurement includes information of a combination of frequency bands at which the UE supports concurrent CSI measurement, where each combination of frequency bands may include at least one frequency band, and the frequency band combination parameters used for CSI measurement include frequency band parameters (for example, CSIBandParameters) of each frequency band in the combination of frequency bands; the frequency band parameters of each frequency band include a downlink frequency band parameter (for example, CSIbandParametersDL) used by the UE for measuring CSI, where the downlink frequency band parameter used by the UE for measuring CSI includes a type of CSI downlink bandwidth (for example, CSIBandwidthClassDL); the type of CSI downlink bandwidth includes a maximum number of CCs on which the UE supports CSI measurement at the frequency band and a configuration of aggregate bandwidth, where the configuration of aggregate bandwidth may be a configuration of the number of resource blocks (Resource Block, RB for short below), for example, aggregate bandwidth<100RB, or 100RB<aggregate bandwidth<200RB. For example, the maximum number of CCs on which the UE supports CSI measurement at the frequency band and the configuration of aggregate bandwidth may be as follows: the maximum number of CCs on which the UE supports CSI measurement at the frequency band is 2, and the aggregate bandwidth is less than or equal to 100 RB.

For example, the combination, reported by the UE, of frequency bands at which the UE supports CSI measurement includes two frequency band combination parameters used for CSI measurement. A first frequency band combination parameter used for CSI measurement includes two frequency band parameters that correspond to two frequency bands respectively, where a first frequency band parameter corresponds to frequency band 1, and the type of CSI downlink bandwidth corresponding to the first frequency band parameter is b, that is, the maximum number of CCs on which the UE supports CSI measurement at the frequency band is 2 and the aggregate bandwidth is less than 100 RB. A second frequency band parameter corresponds to frequency band 2, and the type of CSI downlink bandwidth corresponding to the second frequency band parameter is c, that is, the maximum number of CCs on which the UE supports CSI measurement at the frequency band is 2 and the aggregate bandwidth is greater than 100 RB and less than 200 RB. Therefore, the UE can perform CSI measurement concurrently on a maximum of four CCs corresponding to the first frequency band combination parameter used for CSI measurement. The second frequency band combination parameter used for CSI measurement is similar to the first frequency band combination parameter used for CSI measurement, which is not further described herein.

Manner 2: The UE reports a type of the UE to the base station, where the type of the UE pre-defines the capability of the UE for measuring CSI. For example, the manner of pre-defining the capability of the UE for measuring CSI in the type of the UE may be shown in Table 1, Table 2, Table 3, or Table 4.

TABLE 1

| Type of the UE | Other parameters (for example, a maximum number of bits of a downlink shared channel transport block received within one transmission time interval, TTI for short below) | The number of carriers on which the UE supports CSI measurement |
| --- | --- | --- |
| Type A1 | Parameter 1 | 1 |
| Type A2 | Parameter 2 | 5 |
| Type A3 | Parameter 3 | 8 |

TABLE 2

| Type of the UE | Other parameters (for example, a maximum number of bits of a downlink shared channel transport block received within one TTI) | The number of carriers on which the UE supports concurrent CSI measurement |
| --- | --- | --- |
| Type A1 | Parameter 1 | 1 |
| Type A2 | Parameter 2 | 5 |
| Type A3 | Parameter 3 | 8 |

TABLE 3

| Type of the UE | Other parameters (for example, a maximum number of bits of a downlink shared channel transport block received within one TTI) | The number of carriers on which the UE supports CSI measurement | The number of carriers on which the UE supports concurrent CSI measurement |
| --- | --- | --- | --- |
| Type A1 | Parameter 1 | 1 | 1 |
| Type A2 | Parameter 2 | 5 | 5 |
| Type A3 | Parameter 3 | 8 | 8 |

TABLE 4

| Type of the UE | Other parameters (for example, a maximum number of bits of a downlink shared channel transport block received within one TTI) | The number of carriers on which the UE supports CSI measurement | The number of carriers on which the UE supports concurrent CSI measurement |
| --- | --- | --- | --- |
| Type A1 | Parameter 1 | 1 | 1 |
| Type A2 | Parameter 2 | 5 | 3 |
| Type A3 | Parameter 3 | 8 | 8 |

In the type of the UE, it may also be defined that the number of CSI measurements performed on each carrier on which the UE supports CSI measurement, for example, 3, or the total quantity of CSI measurements performed on all carriers on which the UE supports CSI measurement, for example, 10.

Optionally, the number of carriers on which the UE supports CSI measurement defined in the type of the UE is greater than the number of carriers on which the UE supports concurrent receiving of data transmission, and/or, the number of carriers on which the UE supports concurrent CSI measurement defined in the type of the UE is greater than the number of carriers on which the UE supports concurrent receiving of data transmission.

Figure 3:
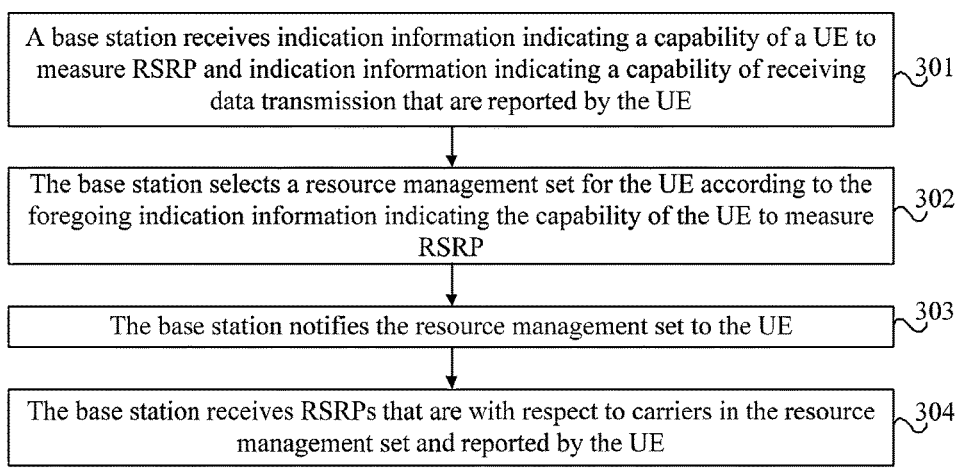
FIG. 3 is a flowchart of another embodiment of a method for virtual carrier aggregation according to the present invention.

FIG. 3 is a flowchart of another embodiment of a method for virtual carrier aggregation according to the present invention. In this embodiment, the specific implementation of the method provided in the embodiment shown in FIG. 1 is described in a scenario where the measurement capability indication information is the indication information indicating the capability of the UE for measuring RSRP and the measurement set is a resource management set.

As shown in FIG. 3, the method for virtual carrier aggregation may include:

Step 301: A base station receives indication information indicating a capability of a UE for measuring RSRP and indication information indicating a capability of receiving data transmission that are reported by the UE.

In this embodiment, the capability of the UE for measuring RSRP includes whether the UE supports measurement of CSI-RS received power.

When the UE supports measurement of CSI-RS received power, the capability of the UE for measuring RSRP may further include the number of carriers on which the UE supports RSRP measurement; or, the capability of the UE for measuring RSRP may further include the number of carriers on which the UE supports RSRP measurement, and one or a combination of the number of reference signal resources for RSRP measurement on each carrier on which the user equipment supports measurement of CSI-RS received power, the number of ports for RSRP measurement performed on each carrier on which the UE supports measurement of CSI-RS received power, and the number of RSRPs measured on each carrier on which the UE performs measurement of CSI-RS received power; or, the capability of the UE for measuring RSRP may further include the number of carriers on which the UE supports RSRP measurement, and one or a combination of the total number of reference signal resources and the total number of ports for RSRP measurement performed on all carriers on which the UE supports measurement of CSI-RS received power, and the total number of RSRPs measured on all carriers on which the UE performs measurement of CSI-RS received power.

Whether the UE supports measurement of CSI-RS received power may be indicated by using one bit in a feature combination indication (for example, feature-Groupind-r12).

Step 302: The base station selects a resource management set for the UE according to the indication information indicating the capability of the UE for measuring RSRP.

In this embodiment, the resource management set includes a set of carriers on which the UE performs RSRP measurement and a reference signal used to perform RSRP measurement performed on each carrier on which the UE performs RSRP measurement.

Step 303: The base station notifies the resource management set to the UE.

Specifically, the base station may notify the resource management set to the UE by using semi-static signaling or dynamic signaling, for example, radio resource control (Radio Resource Control, RRC for short below) signaling.

Step 304: The base station receives RSRPs that are with respect to carriers in the resource management set and reported by the UE.

In the resource management set, the reference signal used to perform RSRP measurement on each carrier on which the UE performs RSRP measurement is configured in an independent manner or in a combined manner; the reference signal used to perform RSRP measurement includes a CSI-RS or a CRS; and the RSRP includes an RSRP based on the CSI-RS and an RSRP based on the CRS.

In this embodiment, in a system that uses a CA technology, the resource management set is a CRS-based set. For example, the resource management set may include seven carriers {CC1, CC2, CC3, CC4, CC5, CC6, CC7}. Under each CC, the UE performs measurement of CRS RESP based on a corresponding CRS.

In a system that uses a combination of the CA technology and a CoMP technology, the resource management set is a CSI-RS-based set, or, a CSI-RS-based/a CRS-based set. The resource management set is used to indicate carriers in the set and indication information of a set of CSI-RSs and/or CRSs used to measure RSRP or RSRP/reference signal received quality (Reference Signal Received Quality, RSRQ for short below) under each carrier.

The reference signal used to measure RSRP under each carrier may be configured in an independent manner or in a combined manner; or, the reference signal used to measure RSRP/RSRQ under each carrier may be configured in an independent manner or in a combined manner.

For example, in the system that uses a combination of the CA technology and the CoMP technology, the resource management set may include seven carriers {CC1, CC2, CC3, CC4, CC5, CC6, CC7} and CSI-RSs used to measure RSRP under each carrier. The UE measures and reports CSI-RS RSRP/RSRQ with respect to the carriers in the resource management set.

In this embodiment, after the base station notifies the resource management set to the UE, the base station may further select a CSI measurement set for the UE, and notify the CSI measurement set to the UE by using semi-static signaling or dynamic signaling. The resource management set includes the CSI measurement set; or the resource management set and the CSI measurement set have an intersection but have no inclusion relationship; or the resource management set and the CSI measurement set have no intersection.

Further, after the base station notifies the CSI measurement set to the UE, the base station may further select, from the CSI measurement set, an activated carrier set for the UE, where the number of carriers in the activated carrier set is less than or equal to the number of carriers on which the UE supports concurrent receiving of data transmission; and then, the base station notifies the activated carrier set to the UE by using semi-static signaling or dynamic signaling.

Figure 4:
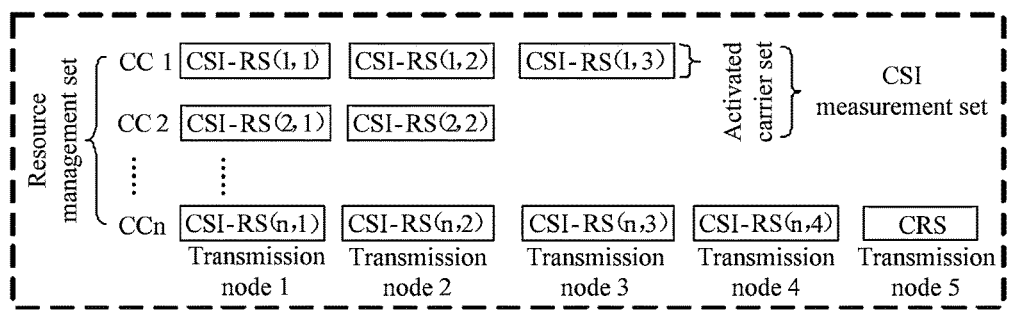
FIG. 4 is a schematic diagram of an embodiment describing a relationship between a resource management set, a CSI measurement set, and an activated carrier set according to the present invention.

For example, a relationship between the resource management set, the CSI measurement set, and the activated carrier set that are selected by the base station for the UE may be shown in FIG. 4. FIG. 4 is a schematic diagram of an embodiment describing a relationship between a resource management set, a CSI measurement set, and an activated carrier set according to the present invention.

In a system that uses the CA technology, the base station may determine a CSI measurement set of the UE according to such information as RSRP/RSRQ that is with respect to the carriers in the resource management set and reported by the UE, selects, according to channel state information, for example, a CQI, a PMI and/or an RI, and the like, of carriers in the CSI measurement set, an activated carrier set for the UE on a dynamic or semi-static basis, and notifies the activated carrier set to the UE by using semi-static signaling or dynamic signaling, for example, a PDCCH, an RRC, a media access control control element (Media Access Control Control Element, MAC CE for short below), and the like.

In a system that uses a combination of the CA technology and the CoMP technology, the base station determines a CSI measurement set of the UE according to such information as RSRP or RSRP/RSRQ that is with respect to a corresponding reference signal on each carrier in the resource management set and reported by the UE, selects, according to channel state information, for example, a CQI, a PMI and/or an RI, and the like, of RSs corresponding to each carrier in the CSI measurement set, an activated carrier set for the UE on a dynamic or semi-static basis, and notifies the activated carrier set to the UE by using semi-static signaling or dynamic signaling, for example, a PDCCH, an RRC, an MAC CE, and the like.

In the foregoing embodiment, a base station receives indication information indicating a capability of a UE for measuring RSRP and indication information indicating a capability of receiving data transmission that are reported by the UE, selects a resource management set for the UE according to the indication information indicating the capability of the UE for measuring RSRP, and notifies the selected resource management set to the UE. Then, the base station can receive RSRP reported by the UE, select a CSI measurement set for the UE, and select, from the CSI measurement set, an activated carrier set for the UE. In this way, the base station can flexibly select an activated carrier set for the UE.

The methods provided in the embodiments shown in FIG. 2 and FIG. 3 of the present invention may be used independently or used in combination, which is not limited in the embodiments of the present invention.

Figure 5:
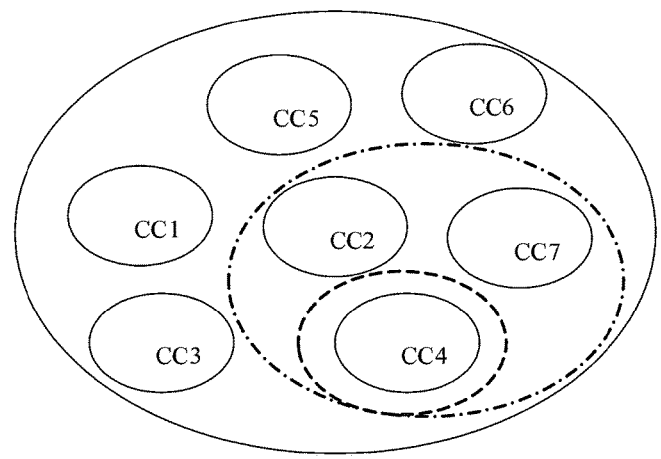
FIG. 5 is a schematic diagram of another embodiment describing a relationship between a resource management set, a CSI measurement set, and an activated carrier set according to the present invention.

In the embodiments shown in FIG. 1, FIG. 2, and FIG. 3 of the present invention, the CSI measurement set and the resource management set may have an inclusion relationship, for example, the resource management set may include the CSI measurement set, as shown in FIG. 5. FIG. 5 is a schematic diagram of another embodiment describing a relationship between a resource management set, a CSI measurement set, and an activated carrier set according to the present invention. In FIG. 5, a broken circle represents an activated carrier set, a dotted circle represents a CSI measurement set, and a solid circle represents a resource management set.

Figure 6:
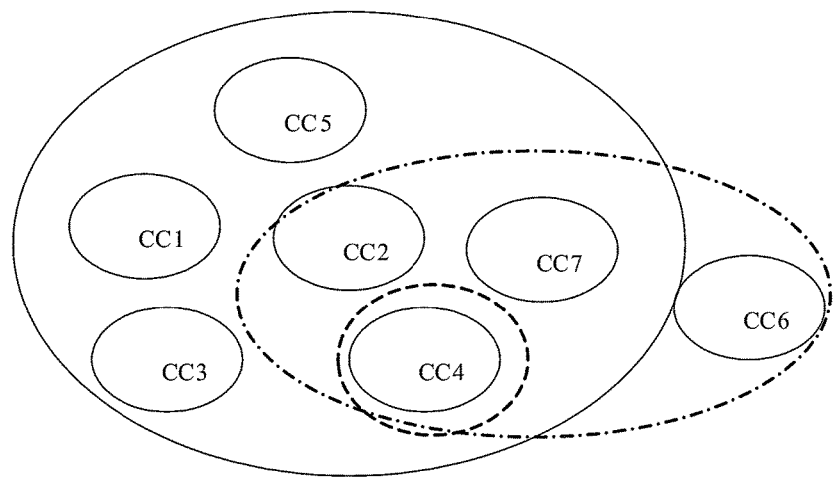
FIG. 6 is a schematic diagram of another embodiment describing a relationship between a resource management set, a CSI measurement set, and an activated carrier set according to the present invention.

Alternatively, the CSI measurement set and the resource management set may have an intersection but have no inclusion relationship, for example, one CSI-RS used to measure CSI is excluded in the resource management set, or the UE needs to measure CSI but does not need to measure RSRP on one carrier. As shown in FIG. 6, FIG. 6 is a schematic diagram of another embodiment describing a relationship between a resource management set, a CSI measurement set, and an activated carrier set according to the present invention. In FIG. 6, a broken circle represents an activated carrier set, a dotted circle represents a CSI measurement set, and a solid circle represents a resource management set.

Alternatively, the CSI measurement set and the resource management set are configured in an independent manner, that is, one carrier or one non-zero power CSI-RS may be included in one set but be excluded in the other set.

In the embodiment of the present invention, a base station receives channel state information that is with respect to carriers in a CSI measurement set and reported by a UE, and selects an activated carrier set for the UE according to the channel state information; then, the base station notifies the activated carrier set to the UE by using semi-static signaling or dynamic signaling, and the UE receives data on carriers in the activated carrier set, where the number of carriers in the activated carrier set is less than the number of carriers in the CSI measurement set.

Specifically, the base station may notify an activated carrier set to the UE by using semi-static signaling or dynamic signaling in at least one of the following manners:

Manner 1: The base station may notify an activated carrier set in at least one subframe to the UE in a pre-defined manner or by using higher layer signaling, where the at least one subframe may be pre-defined or configured by using higher layer signaling and an activated carrier in the activated carrier set is pre-defined or configured by using higher layer signaling; and when the activated carrier in the activated carrier set is pre-defined, the activated carrier is pre-defined as a primary carrier or a secondary carrier.

For example, activated carrier sets in subframes 0, 4, 5, and 9 in a radio frame may be pre-defined as primary carriers, or activated carrier sets in subframes 0 and 5 in a radio frame may be defined as primary carriers and activated carrier sets in subframes 4 and 9 may be pre-defined as secondary carriers.

In another example, the base station may notify, by using higher layer signaling, a position of a subframe on which activated carrier sets are primary carriers to the UE, and/or, the base station may notify, by using higher layer signaling, a position of a subframe on which activated carrier sets are secondary carriers to the UE.

In another example, the base station may notify, by using higher layer signaling, the number of activated carriers and activated carrier sets in each subframe of the at least one subframe to the UE, where the number of activated carriers may be an integer greater than or equal to 0; when the number of activated carriers in one subframe is zero, the base station does not need to notify an activated carrier set in the subframe; when the number of activated carriers in one subframe is non-zero, the base station needs to notify an activated carrier set in the subframe.

Manner 2: The base station sends dynamic signaling to the UE by using an activated carrier, to notify an activated carrier after N subframes to the UE, where the activated carrier may be a primary carrier and/or a secondary carrier.

Specifically, the dynamic signaling may be downlink control information sent by the base station through a PDCCH or an enhanced physical downlink control channel (ePDCCH for short below) or a physical downlink shared channel (PDSCH for short below).

Specifically, the dynamic signaling may be sent through a public search space of the PDCCH or the ePDCCH, an activated carrier dedicated search space or a UE dedicated search space.

Specifically, the dynamic signaling may be sent in the PDSCH in a manner of multiplexing with downlink data.

Specifically, the dynamic signaling includes a subframe indication field, where a value of the subframe indication field is N. Further, the dynamic signaling further includes a carrier indication field, where the carrier indication field is used to indicate an activated carrier set.

Manner 3: When the base station does not notify an activated carrier set of a first frame to the UE by using semi-static signaling or dynamic signaling, the activated carrier set of the first subframe is a primary carrier or an activated carrier set which is in a second subframe closest to and before the first subframe and is known by the user equipment.

Specifically, at an initial phase of communications, the UE does not know information about any activated carrier set. In this case, the UE uses the primary carrier as an activated carrier set; at a sustained phase of communications, to save signaling overheads, the base station may not notify the activated carrier set of the first subframe to the UE. In this case, in the first subframe, the UE may use the primary carrier or an activated carrier set which is in a second subframe closest to and before the first subframe and is already known by the UE, as an activated carrier set of the first subframe.

The primary carrier is at least one carrier obtained by the UE by configuring higher layer signaling or in a pre-defined manner, where the at least one carrier is at least one of carriers on which the UE performs CSI measurement; the secondary carrier is at least one carrier obtained by the UE by configuring higher layer signaling or in a pre-defined manner, where the at least one carrier is at least one of carriers on which the UE performs CSI measurement.

Figure 7:
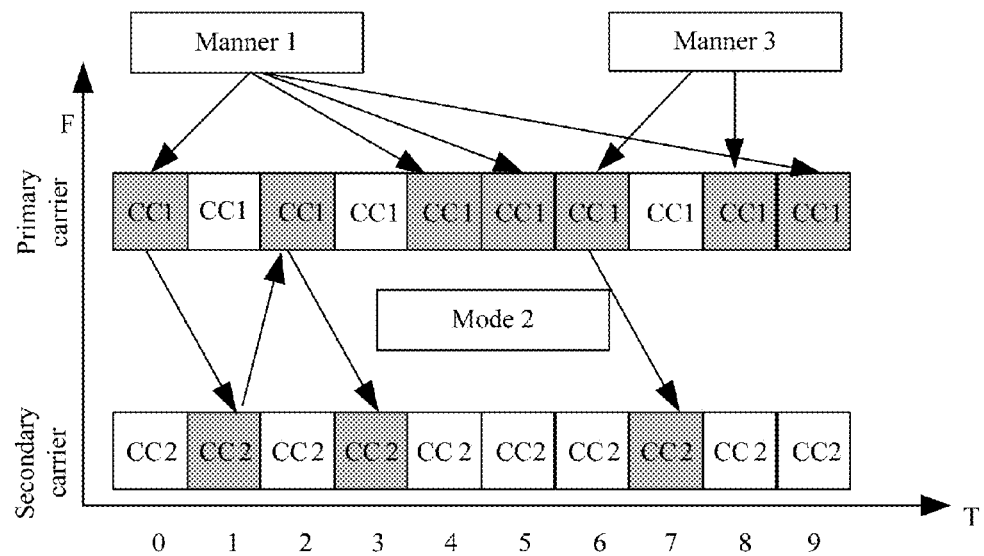
FIG. 7 is a schematic diagram of an embodiment describing a manner where a base station notifies an activated carrier set to a UE according to the present invention.

It should be noted that the foregoing three manners may be used in any combination, as shown in FIG. 7. FIG. 7 is a schematic diagram of an embodiment describing a manner where a base station notifies an activated carrier set to a UE according to the present invention. In FIG. 7, a CSI measurement set includes two carriers, CC1 and CC2 respectively, where CC1 is a primary carrier which is pre-defined or is configured by using higher layer signaling and CC2 is a secondary carrier. In FIG. 7, the horizontal axis represents subframe numbers, where subframes 0, 4, 5, and 9 notify an activated carrier set in a first manner, that is, the base station notifies, in a pre-defined manner or by using higher layer signaling, a UE that activated carrier sets in subframes 0, 4, 5, and 9 are primary carriers (CC1); subframes 1, 2, 3, and 7 notify an activated carrier set in a second manner, that is, the base station sends dynamic signaling to the UE by using an activated carrier, to notify an activated carrier after one subframe to the UE; subframes 6 and 8 notify an activated carrier set in a third manner, that is, when the base station does not notify an activated carrier set of one subframe to the UE by using semi-static signaling or dynamic signaling, the primary carrier (CC1) is the activated carrier set of the subframe. In FIG. 7, the shaded box represents an activated carrier, and the non-shaded box represents a virtual carrier.

In the embodiment of the present invention, the base station notifies an activated carrier set to a UE in one or a combination of the foregoing three manners, which may enable the UE that can support a data processing capability on only one or a few carriers to select a carrier dynamically from multiple carriers, thereby increasing throughput of the UE and optimizing network throughput.

Further, in the embodiment of the present invention, after the base station notifies the activated carrier set to the UE by using semi-static signaling or dynamic signaling, the base station may send downlink control information on an activated carrier in the activated carrier set, and send a PDSCH on the activated carrier according to the downlink control information; and/or, when the activated carrier in the activated carrier set is an activated carrier after N subframes and notified by the base station by using dynamic signaling, the base station can send downlink control information on an activated carrier on which the dynamic signaling is sent, and send, according to the downlink control information, a PDCCH or an ePDCCH or a PDSCH on the activated carrier after the N subframes indicated by the dynamic signaling.

Figure 8:
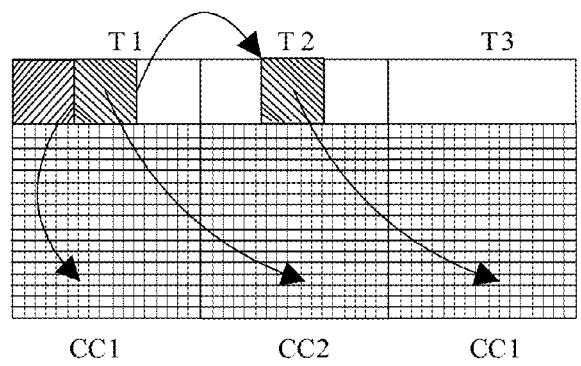
FIG. 8 is a schematic diagram of an embodiment describing the sending of a PDCCH or an ePDCCH or a PDSCH by a base station according to the present invention.

It should be noted that the foregoing two manners may be used in combination, as shown in FIG. 8. FIG. 8 is a schematic diagram of an embodiment describing the sending of a PDCCH or an ePDCCH or a PDSCH by a base station according to the present invention. In FIG. 8, a CSI measurement set includes two carriers, CC1 and CC2 respectively, where CC1 is a primary carrier which is pre-defined or is configured by using higher layer signaling and CC2 is a secondary carrier. An activated carrier at T1 time is CC1, an activated carrier at T2 time is CC1, and an activated carrier at T3 time is CC1. The base station sends PDCCH1 on CC1 at T1 time, and sends a PDSCH on CC1 at T1 time according to PDCCH1; the base station sends PDCCH2 on CC1 at T1 time, and sends PDCCH2 and the PDSCH on CC2 at T2 time according to PDCCH2; the base station sends PDCCH2 on CC2 at T2 time, and sends the PDSCH on CC1 at T3 time according to PDCCH2. In FIG. 8,  represents PDCCH1,  represents PDCCH2, and  represents the PDSCH.

In the embodiment of the present invention, after the base station notifies an activated carrier set to the UE by using semi-static signaling or dynamic signaling, when the activated carrier set is an activated carrier set in at least one subframe and notified by the base station to the UE in a pre-defined manner or by using higher layer signaling, the base station sends one or a combination of a physical broadcast channel, a synchronization channel and a paging channel on an activated carrier in the at least one subframe.

In addition, after the base station notifies an activated carrier set to the UE by using semi-static signaling or dynamic signaling, the base station may notify a virtual activated carrier set to the UE in a pre-defined manner or by using semi-static signaling or dynamic signaling, so that the UE measures channel state information on a virtual activated carrier in the virtual activated carrier set rather than receives the PDCCH, the ePDCCH, and the PDSCH. The manner where the base station notifies a virtual activated carrier set to the UE in a pre-defined manner or by using semi-static signaling or dynamic signaling is the same as the manner where the base station notifies an activated carrier set to the UE by using semi-static signaling or dynamic signaling, which is not further described herein. The virtual activated carrier set may also be a set of carriers other than the activated carrier in the CSI measurement.

Further, after the base station notifies the activated carrier set to the UE by using semi-static signaling or dynamic signaling, physical broadcast channels sent by the base station on an activated carrier in the activated carrier set are the same as physical broadcast channels on the primary carrier; or physical broadcast channels sent by the base station on carriers in the CSI measurement set are the same.

Figure 9:
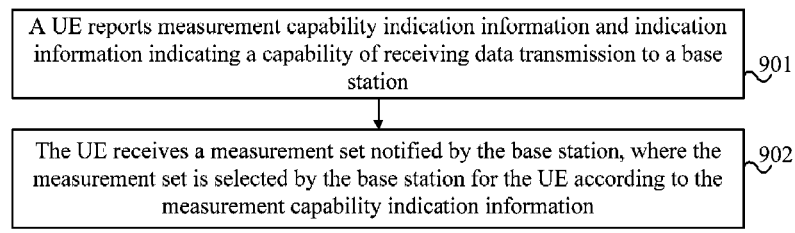
FIG. 9 is a flowchart of another embodiment of a method for virtual carrier aggregation according to the present invention.

FIG. 9 is a flowchart of another embodiment of a method for virtual carrier aggregation according to the present invention. As shown in FIG. 9, the method for virtual carrier aggregation may include:

Step 901: A UE reports measurement capability indication information and indication information indicating a capability of receiving data transmission to a base station.

Step 902: The UE receives a measurement set notified by the base station, where the measurement set is selected by the base station for the UE according to the measurement capability indication information.

The indication information indicating the capability of receiving data transmission includes information of carriers on which the UE supports concurrent receiving of data transmission, and the measurement capability indication information includes indication information indicating a capability of the UE for measuring CSI and/or indication information indicating a capability of the UE for measuring RSRP.

In this embodiment, when the measurement capability indication information is the indication information indicating the capability of the UE for measuring CSI, the number of carriers on which the UE supports CSI measurement is greater than the number of carriers on which the UE supports concurrent receiving of data transmission, and/or, the number of carriers on which the UE supports concurrent CSI measurement is greater than the number of carriers on which the UE supports concurrent receiving of data transmission.

In this embodiment, when the measurement capability indication information is the indication information indicating the capability of the UE for measuring CSI, the reporting, by the UE, measurement capability indication information to the base station may be as follows: The UE reports a type of the UE to the base station, where the type of the UE pre-defines the capability of the UE for measuring CSI; or, the UE directly reports the capability of the UE for measuring CSI to the base station. In this embodiment, for details about the manner where the UE reports the indication information indicating the capability of the UE for measuring CSI to the base station, reference may be made to the description in the embodiment shown in FIG. 2 of the present invention, which is not further described herein.

The capability of the UE for measuring CSI includes: the number of carriers on which the UE supports CSI measurement, and/or, the number of carriers on which the UE supports concurrent CSI measurement; or, the capability of the UE for measuring CSI may be as follows: one or all of the number of carriers on which the UE supports CSI measurement and the number of carriers on which the UE supports concurrent CSI measurement, and the number of CSI measurements performed on each carrier on which the UE supports CSI measurement; or, the capability of the UE for measuring CSI may be as follows: one or all of the number of carriers on which the UE supports CSI measurement and the number of carriers on which the UE supports concurrent CSI measurement, and the total quantity of CSI measurements performed by the UE on all carriers on which the UE performs CSI measurement; or, the capability of the UE for measuring CSI may be as follows: one or all of a combination of carriers on which the UE supports CSI measurement and a combination of carriers on which the UE supports concurrent CSI measurement, and the number of CSI measurements performed by the UE on each carrier on which the UE performs CSI measurement; or, the capability of the UE for measuring CSI may be as follows: one or all of a combination of carriers on which the UE supports CSI measurement and a combination of carriers on which the UE supports concurrent CSI measurement, and the total quantity of CSI measurements performed by the UE on all carriers on which the UE performs CSI measurement.

Alternatively, the capability of the UE for measuring CSI may include: the number of carriers on which the UE supports CSI measurement, and/or, the number of carriers on which the UE supports concurrent CSI measurement; or, the capability of the UE for measuring CSI may be as follows: one or all of the number of carriers on which the UE supports CSI measurement and the number of carriers on which the UE supports concurrent CSI measurement, and the number of CSI measurements performed on each carrier on which the UE supports CSI measurement; or, the capability of the UE for measuring CSI may be as follows: one or all of the number of carriers on which the UE supports CSI measurement and the number of carriers on which the UE supports concurrent CSI measurement, and the total quantity of CSI measurements performed on all carriers on which the UE supports CSI measurement; or, the capability of the UE for measuring CSI may be as follows: one or all of a combination of carriers on which the UE supports CSI measurement and a combination of carriers on which the UE supports concurrent CSI measurement, and the number of CSI measurements performed on each carrier on which the UE supports CSI measurement; or, the capability of the UE for measuring CSI may be as follows: one or all of a combination of carriers on which the UE supports CSI measurement and a combination of carriers on which the UE supports concurrent CSI measurement, and the total quantity of CSI measurements performed on all carriers on which the UE supports CSI measurement.

In this embodiment, when the measurement capability indication information is the indication information indicating the capability of the UE for measuring CSI, the measurement set is a CSI measurement set, where the CSI measurement set includes a set of carriers on which the UE performs CSI measurement or the CSI measurement set includes a set of carriers on which the UE performs CSI measurement and information of a reference signal used to perform CSI measurement on each carrier on which the UE performs CSI measurement. In this way, after step 902, the UE may further report channel state information with respect to carriers in the CSI measurement set to the base station.

In the CSI measurement set, the reference signal used to perform CSI measurement on each carrier on which the UE performs CSI measurement may be configured in an independent manner or in a combined manner. The reference signal used to perform CSI measurement may include a CSI-RS and a CRS.

In this embodiment, when the measurement capability indication information is the indication information indicating the capability of the UE for measuring RSRP, the capability of the UE for measuring RSRP includes whether the UE supports measurement of CSI-RS received power; further, when the UE supports measurement of CSI-RS received power, the capability of the UE for measuring RSRP further includes the number of carriers on which the UE supports RSRP measurement; or, the capability of the UE for measuring RSRP further includes the number of carriers on which the UE supports RSRP measurement and one or a combination of the number of reference signal resources for RSRP measurement on each carrier on which the user equipment supports measurement of CSI-RS received power, the number of ports for RSRP measurement on each carrier on which the UE supports measurement of CSI-RS received power, and the number of RSRPs measured on each carrier on which the UE performs measurement of CSI-RS received power; or, the capability of the UE for measuring RSRP further includes the number of carriers on which the UE supports RSRP measurement, and one or a combination of the total number of reference signal resources and the total number of ports for RSRP measurement performed on all carriers on which the UE supports measurement of CSI-RS received power, and the total number of RSRPs measured on all carriers on which the UE performs measurement of CSI-RS received power.

In this embodiment, when the measurement capability indication information is the indication information indicating the capability of the UE for measuring RSRP, the measurement set is a resource management set, where the resource management set includes a set of carriers on which the UE performs RSRP measurement and a reference signal used to perform RSRP measurement on each carrier on which the UE performs RSRP measurement. In this way, after step 902, the UE may further report RSRPs with respect to carriers in the resource management set to the base station.

In the resource management set, the reference signal used to perform RSRP measurement on each carrier on which the UE performs RSRP measurement may be configured in an independent manner or in a combined manner. The reference signal used to perform RSRP measurement includes a CSI-RS or a CRS; and the RSRP includes an RSRP based on the CSI-RS and an RSRP based on the CRS.

In this embodiment, when the measurement capability indication information is the indication information indicating the capability of the UE for measuring RSRP, after step 902, the UE may further obtain a CSI measurement set notified by the UE by using semi-static signaling or dynamic signaling, where the CSI measurement set is selected by the base station for the UE.

The resource management set may include the CSI measurement set; or the resource management set and the CSI measurement set have an intersection but have no inclusion relationship; or, the resource management set and the CSI measurement set have no intersection.

In this embodiment, after the UE obtains the CSI measurement set, the UE may further obtain an activated carrier set notified by the base station by using semi-static signaling or dynamic signaling, where the activated carrier set is selected, from the CSI measurement set, by the base station for the UE, where the number of carriers in the activated carrier set is less than or equal to the number of carriers on which the UE supports concurrent receiving of data transmission.

Specifically, the UE may obtain the activated carrier set notified by the base station by using semi-static signaling or dynamic signaling in the following manners:

Manner 1: The UE obtains an activated carrier set in at least one subframe and notified by the base station in a pre-defined manner or by using higher layer signaling, where the at least one subframe may be pre-defined or configured by using higher layer signaling and an activated carrier in the activated carrier set is pre-defined or configured by using higher layer signaling; and when the activated carrier in the activated carrier set is pre-defined, the activated carrier is pre-defined as a primary carrier or a secondary carrier.

Manner 2: The UE obtains an activated carrier after N subframes and notified by the base station by using dynamic signaling, where the activated carrier includes a primary carrier and/or a secondary carrier; and the dynamic signaling is sent by the base station by using an activated carrier, where the dynamic signaling may be as follows: downlink control information sent by the base station through a PDCCH or an ePDCCH or a PDSCH.

Manner 3: When the base station does not notify an activated carrier set of a first frame to the UE by using semi-static signaling or dynamic signaling, the activated carrier set of the first subframe is a primary carrier or an activated carrier set which is in a second subframe closest to and before the first subframe and is known by the user equipment.

The foregoing three manners may be used independently or be used in combination.

In this embodiment, the UE obtains an activated carrier set notified by the base station in one or a combination of the foregoing three manners, which may enable the UE that can support a data processing capability on only one or a few carriers to select a carrier dynamically from multiple carriers, thereby increasing throughput of the UE and optimizing network throughput.

The primary carrier is at least one carrier obtained by the UE by configuring higher layer signaling or in a pre-defined manner, where the at least one carrier is at least one of carriers on which the UE performs CSI measurement.

The secondary carrier is at least one carrier obtained by the UE by configuring higher layer signaling or in a pre-defined manner, where the at least one carrier is at least one of carriers on which the UE performs CSI measurement.

In this embodiment, after the UE obtains the activated carrier set notified by the base station by using semi-static signaling or dynamic signaling, the UE receives downlink control information on an activated carrier in the activated carrier set, and receives a PDSCH on the activated carrier according to the downlink control information; and/or, when the activated carrier in the activated carrier set is an activated carrier after N subframes and notified by the base station by using dynamic signaling, the UE receives downlink control information on an activated carrier on which the dynamic signaling is sent, and receives, according to the downlink control information, a PDCCH or an ePDCCH or a PDSCH on the activated carrier after the N subframes indicated by the dynamic signaling.

In this embodiment, after the UE obtains an activated carrier set notified by the base station by using semi-static signaling or dynamic signaling, when the activated carrier set is an activated carrier set in at least one subframe and notified by the base station to the UE in a pre-defined manner or by using higher layer signaling, the UE receives one or a combination of a physical broadcast channel, a synchronization channel and a paging channel on an activated carrier in the at least one subframe.

In this embodiment, after obtaining an activated carrier set notified by the base station by using semi-static signaling or dynamic signaling, the UE measures channel state information on an activated carrier in the activated carrier set.

In this embodiment, after the UE obtains the activated carrier set notified by the base station by using semi-static signaling or dynamic signaling, the UE obtains a virtual activated carrier set notified by the base station in a pre-defined manner or by using semi-static signaling or dynamic signaling; the UE measures channel state information on a virtual activated carrier in the virtual activated carrier set rather than receives the PDCCH, the ePDCCH, and the PDSCH.

In the foregoing embodiment, a UE reports measurement capability indication information and indication information indicating a capability of receiving data transmission to a base station, and then receives a measurement set notified by the base station, where the measurement set is selected by the base station for the UE according to the measurement capability indication information, where the measurement capability indication information includes indication information indicating a capability of the UE for measuring CSI and/or indication information indicating a capability of the UE for measuring RSRP. Then, the base station can receive the channel state information and/or the RSRP reported by the UE, select a CSI measurement set for the UE, and select, from the CSI measurement set, an activated carrier set for the UE. In this way, the base station can flexibly select an activated carrier set for the UE.

The embodiments of the present invention describe, by using a system that uses a combination of a CA technology and a CoMP technology as an example, the method for virtual carrier aggregation provided by the present invention, but the embodiments of the present invention are not limited to this system. The method for virtual carrier aggregation provided by the present invention may also be applied in a system that uses a combination of the CA technology and another technology.

It should be noted that the carriers in the embodiments of the present invention may be sent by different network nodes (for example, a base station) or be sent by a same network node. The carriers in the embodiments of the present invention may be carriers, cells that use carriers or network nodes in a cell that use carriers.

Persons of ordinary skill in the art may understand that, all or a part of the steps of the foregoing method embodiments may be implemented by a program instructing relevant hardware. The foregoing programs may be stored in a computer readable storage medium. When the program runs, the foregoing steps of the method embodiments are performed. The foregoing storage medium includes various mediums capable of storing program code, such as a ROM, a RAM, a magnetic disk, or an optical disc.

Figure 10:
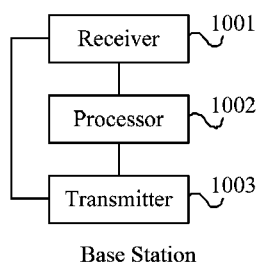
FIG. 10 is a schematic structural diagram of an embodiment of a base station according to the present invention.

FIG. 10 is a schematic structural diagram of an embodiment of a base station according to the present invention. The base station in this embodiment can implement the process of the embodiment shown in FIG. 1, FIG. 2 or FIG. 3.

As shown in FIG. 10, the base station may include a receiver 1001, a processor 1002, and a transmitter 1003.

The receiver 1001 is configured to receive measurement capability indication information and indication information indicating a capability of receiving data transmission that are reported by a UE, and send the measurement capability indication information to the processor 1002.

The processor 1002 is configured to receive the measurement capability indication information from the receiver 1001, select a measurement set for the UE according to the measurement capability indication information, and send the measurement set to the transmitter 1003.

The transmitter 1003 is configured to obtain the measurement set from the processor 1002, and notify the measurement set to the UE.

The indication information indicating the capability of receiving data transmission includes information of carriers on which the UE supports concurrent receiving of data transmission, and the measurement capability indication information includes indication information indicating a capability of the UE for measuring CSI and/or indication information indicating a capability of the UE for measuring RSRP.

In this embodiment, when the measurement capability indication information is the indication information indicating the capability of the UE for measuring CSI, the number of carriers on which the UE supports CSI measurement is greater than the number of carriers on which the UE supports concurrent receiving of data transmission, and/or, the number of carriers on which the UE supports concurrent CSI measurement is greater than the number of carriers on which the UE supports concurrent receiving of data transmission.

In this embodiment, the receiver 1001 is specifically configured to: when the measurement capability indication information is the indication information indicating the capability of the UE for measuring CSI, receive a type of the UE reported by the UE, where the type of the UE pre-defines the capability of the UE for measuring CSI; or, the receiver 1001 may receive the capability of the UE for measuring CSI that is directly reported by the UE.

The capability of the UE for measuring CSI includes: the number of carriers on which the UE supports CSI measurement, and/or, the number of carriers on which the UE supports concurrent CSI measurement; or, the capability of the UE for measuring CSI may be as follows: one or all of the number of carriers on which the UE supports CSI measurement and the number of carriers on which the UE supports concurrent CSI measurement, and the number of CSI measurements performed on each carrier on which the UE supports CSI measurement; or, the capability of the UE for measuring CSI may be as follows: one or all of the number of carriers on which the UE supports CSI measurement and the number of carriers on which the UE supports concurrent CSI measurement, and the total quantity of CSI measurements performed by the UE on all carriers on which the UE performs CSI measurement; or, the capability of the UE for measuring CSI may be as follows: one or all of a combination of carriers on which the UE supports CSI measurement and a combination of carriers on which the UE supports concurrent CSI measurement, and the number of CSI measurements performed by the UE on each carrier on which the UE performs CSI measurement; or, the capability of the UE for measuring CSI may be as follows: one or all of a combination of carriers on which the UE supports CSI measurement and a combination of carriers on which the UE supports concurrent CSI measurement, and the total quantity of CSI measurements performed by the UE on all carriers on which the UE performs CSI measurement.

Alternatively, the capability of the UE for measuring CSI may include: the number of carriers on which the UE supports CSI measurement, and/or, the number of carriers on which the UE supports concurrent CSI measurement; or, the capability of the UE for measuring CSI may be as follows: one or all of the number of carriers on which the UE supports CSI measurement and the number of carriers on which the UE supports concurrent CSI measurement, and the number of CSI measurements performed on each carrier on which the UE supports CSI measurement; or, the capability of the UE for measuring CSI may be as follows: one or all of the number of carriers on which the UE supports CSI measurement and the number of carriers on which the UE supports concurrent CSI measurement, and the total quantity of CSI measurements performed on all carriers on which the UE supports CSI measurement; or, the capability of the UE for measuring CSI may be as follows: one or all of a combination of carriers on which the UE supports CSI measurement and a combination of carriers on which the UE supports concurrent CSI measurement, and the number of CSI measurements performed on each carrier on which the UE supports CSI measurement; or, the capability of the UE for measuring CSI may be as follows: one or all of a combination of carriers on which the UE supports CSI measurement and a combination of carriers on which the UE supports concurrent CSI measurement, and the total quantity of CSI measurements performed on all carriers on which the UE supports CSI measurement.

Further, the receiver 1001 is further configured to: when the measurement capability indication information is the indication information indicating the capability of the UE for measuring CSI and the measurement set is a CSI measurement set, receive, after the transmitter 1003 notifies the CSI measurement set to the UE, channel state information that is with respect to carriers in the CSI measurement set and reported by the UE, where the CSI measurement set includes a set of carriers on which the UE performs CSI measurement or the CSI measurement set includes a set of carriers on which the UE performs CSI measurement and information of a reference signal used to perform CSI measurement on each carrier on which the UE performs CSI measurement.

In the CSI measurement set, the reference signal used to perform CSI measurement on each carrier on which the UE performs CSI measurement may be configured in an independent manner or in a combined manner. The reference signal used to perform CSI measurement may include a CSI-RS and a CRS.

In this embodiment, when the measurement capability indication information is the indication information indicating the capability of the UE for measuring RSRP, the capability of the UE for measuring RSRP includes whether the UE supports measurement of CSI-RS received power; further, when the UE supports measurement of CSI-RS received power, the capability of the UE for measuring RSRP further includes the number of carriers on which the UE supports RSRP measurement; or, the capability of the UE for measuring RSRP further includes the number of carriers on which the UE supports RSRP measurement and one or a combination of the number of reference signal resources for RSRP measurement on each carrier on which the user equipment supports measurement of CSI-RS received power, the number of ports for RSRP measurement on each carrier on which the UE supports measurement of CSI-RS received power, and the number of RSRPs measured on each carrier on which the UE performs measurement of CSI-RS received power; or, the capability of the UE for measuring RSRP further includes the number of carriers on which the UE supports RSRP measurement, and one or a combination of the total number of reference signal resources and the total number of ports for RSRP measurement on all carriers on which the UE supports measurement of CSI-RS received power, and the total number of RSRPs measured on all carriers on which the UE performs measurement of CSI-RS received power.

The receiver 1001 is further configured to: when the measurement capability indication information is the indication information indicating the capability of the UE for measuring RSRP and the measurement set is a resource management set, receive, after the transmitter 1003 notifies the CSI measurement set to the UE, RSRPs that are with respect to carriers in the resource management set and reported by the UE, where the resource management set includes a set of carriers on which the UE performs RSRP measurement and a reference signal used to perform RSRP measurement on each carrier on which the UE performs RSRP measurement.

In the foregoing resource management set, the reference signal used to perform RSRP measurement on each carrier on which the UE performs RSRP measurement may be configured in an independent manner or in a combined manner. The reference signal used to perform RSRP measurement includes a CSI-RS or a CRS; and the RSRP includes an RSRP based on the CSI-RS and an RSRP based on the CRS.

Further, the processor 1002 is further configured to select a CSI measurement set for the UE after the transmitter 1003 notifies the resource management set to the UE, and send the CSI measurement set to the transmitter 1003. In this case, the transmitter 1003 is further configured to obtain the CSI measurement set from the processor 1002, and notify the CSI measurement set to the UE by using semi-static signaling or dynamic signaling.

The resource management set may include the CSI measurement set; or the resource management set and the resource management set and the CSI measurement set have an intersection but have no inclusion relationship; or, the resource management set and the CSI measurement set have no intersection.

Further, the processor 1002 is further configured to select, from the CSI measurement set, an activated carrier set for the UE after the transmitter 1003 notifies the CSI measurement set to the UE, and send the activated carrier set to the transmitter 1003, where the number of carriers in the activated carrier set is less than or equal to the number of carriers on which the UE supports concurrent receiving of data transmission. In this case, the transmitter 1003 is further configured to obtain the activated carrier set from the processor 1002, and notify the activated carrier set to the UE by using semi-static signaling or dynamic signaling.

Specifically, the transmitter 1003 is specifically configured to notify an activated carrier set in at least one subframe to the UE in a pre-defined manner or by using higher layer signaling, where the at least one subframe is pre-defined or configured by using higher layer signaling and an activated carrier in the activated carrier set is pre-defined or configured by using higher layer signaling; and when the activated carrier in the activated carrier set is pre-defined, the activated carrier is pre-defined as a primary carrier or a secondary carrier; and/or the transmitter 1003 is specifically configured to send dynamic signaling to the UE by using an activated carrier, to notify an activated carrier after N subframes to the UE, where the activated carrier includes a primary carrier and/or secondary carrier and the dynamic signaling is sent by the base station by using an activated carrier. The dynamic signaling may be as follows: downlink control information sent by the base station through a PDCCH or an ePDCCH or a PDSCH; and/or, when the transmitter 1003 does notify an activated carrier set of a first subframe to the UE by using semi-static signaling or dynamic signaling, the activated carrier set of the first subframe is a primary carrier or an activated carrier set which is in a second subframe closest to and before the first subframe and is known by the user equipment.

In this embodiment, the transmitter 1003 notifies an activated carrier set to a UE in one or a combination of the foregoing three manners, which may enable the UE that can support a data processing capability on only one or a few carriers to select a carrier dynamically from multiple carriers, thereby increasing throughput of the UE and optimizing network throughput.

The primary carrier is at least one carrier obtained by the UE by configuring higher layer signaling or in a pre-defined manner, where the at least one carrier is at least one of carriers on which the UE performs CSI measurement.

The secondary carrier is at least one carrier obtained by the UE by configuring higher layer signaling or in a pre-defined manner, where the at least one carrier is at least one of carriers on which the UE performs CSI measurement.

Further, the transmitter 1003 is further configured to: after notifying an activated carrier set to the UE, send downlink control information on an activated carrier in the activated carrier set, and send a PDSCH on the activated carrier according to the downlink control information; and/or, the transmitter 1003 is further configured to: after notifying an activated carrier set to the UE, when an activated carrier in the activated carrier set is an activated carrier after N subframes and notified by the transmitter 1003 by using dynamic signaling, send downlink control information on the activated carrier on which the dynamic signaling is sent, and send, according to the downlink control information, a PDCCH or an ePDCCH or a PDSCH on the activated carrier after the N subframes indicated by the dynamic signaling.

Further, the transmitter 1003 is further configured to: after notifying the activated carrier set to the UE, when the activated carrier set is an activated carrier set in at least one subframe and notified by the transmitter 1003 to the UE in a pre-defined manner or by using higher layer signaling, send one or a combination of a physical broadcast channel, a synchronization channel and a paging channel on the activated carrier in the at least one subframe.

Further, the transmitter 1003 is further configured to: after notifying an activated carrier set to the UE, notify a virtual activated carrier set to the UE in a pre-defined manner or by using semi-static signaling or dynamic signaling, so that the UE measures channel state information on a virtual activated carrier in the virtual activated carrier set rather than receives the PDCCH, the ePDCCH, and the PDSCH. The manner where the transmitter 1003 notifies a virtual activated carrier set to the UE in a pre-defined manner or by using semi-static signaling or dynamic signaling is the same as the manner where the transmitter 1003 notifies an activated carrier set to the UE by using semi-static signaling or dynamic signaling, which is not further described herein. The virtual activated carrier set may also be a set of carriers other than the activated carrier in the CSI measurement.

Further, after the transmitter 1003 notifies the activated carrier set to the UE, physical broadcast channels sent by the transmitter 1003 on an activated carrier in the activated carrier set is the same as physical broadcast channels on the primary carrier; or physical broadcast channels sent by the transmitter 1003 on carriers in the CSI measurement set are the same.

In the base station, a receiver 1001 receives measurement capability indication information and indication information indicating a capability of receiving data transmission that are reported by a UE; a processor 1002 selects a measurement set for the UE according to the measurement capability indication information, and a transmitter 1003 notifies the selected measurement set to the UE, where the measurement capability indication information includes indication information indicating a capability of the UE for measuring CSI and/or indication information indicating a capability of the UE for measuring RSRP. Then, the receiver 1001 can receive the channel state information and/or the RSRP reported by the UE; the processor 1002 selects a CSI measurement set for the UE, and selects, from the CSI measurement set, an activated carrier set for the UE. In this way, the base station can flexibly select an activated carrier set for the UE.

Figure 11:
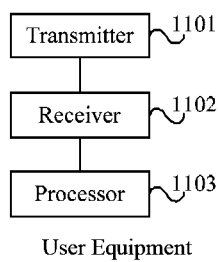
FIG. 11 is a schematic structural diagram of an embodiment of a user equipment according to the present invention.

FIG. 11 is a schematic structural diagram of an embodiment of a user equipment according to the present invention. The user equipment in this embodiment can implement the process of the embodiment shown in FIG. 9. As shown in FIG. 11, the user equipment may include a transmitter 1101 and a receiver 1102.

The transmitter 1011 is configured to report measurement capability indication information and indication information indicating a capability of receiving data transmission to a base station.

The receiver 1102 is configured to receive a measurement set notified by the base station, where the measurement set is selected by the base station for the UE according to the measurement capability indication information.

The indication information indicating the capability of receiving data transmission includes information of carriers on which the UE supports concurrent receiving of data transmission, and the measurement capability indication information includes indication information indicating a capability of the UE for measuring CSI and/or indication information indicating a capability of the UE for measuring RSRP.

In this embodiment, when the measurement capability indication information is the indication information indicating the capability of the UE for measuring CSI, the number of carriers on which the UE supports CSI measurement is greater than the number of carriers on which the UE supports concurrent receiving of data transmission, and/or, the number of carriers on which the UE supports concurrent CSI measurement is greater than the number of carriers on which the UE supports concurrent receiving of data transmission.

In this embodiment, the transmitter 1101 is specifically configured to report a type of the UE to the base station when the measurement capability indication information is the indication information indicating the capability of the UE for measuring CSI, where the type of the UE pre-defines the capability of the UE for measuring CSI; or, the transmitter 1101 may also report the capability of the UE for measuring CSI to the base station directly.

The capability of the UE for measuring CSI includes: the number of carriers on which the UE supports CSI measurement, and/or, the number of carriers on which the UE supports concurrent CSI measurement; or, the capability of the UE for measuring CSI may be as follows: one or all of the number of carriers on which the UE supports CSI measurement and the number of carriers on which the UE supports concurrent CSI measurement, and the number of CSI measurements performed on each carrier on which the UE supports CSI measurement; or, the capability of the UE for measuring CSI may be as follows: one or all of the number of carriers on which the UE supports CSI measurement and the number of carriers on which the UE supports concurrent CSI measurement, and the total quantity of CSI measurements performed by the UE on all carriers on which the UE performs CSI measurement; or, the capability of the UE for measuring CSI may be as follows: one or all of a combination of carriers on which the UE supports CSI measurement and a combination of carriers on which the UE supports concurrent CSI measurement, and the number of CSI measurements performed by the UE on each carrier on which the UE performs CSI measurement; or, the capability of the UE for measuring CSI may be as follows: one or all of a combination of carriers on which the UE supports CSI measurement and a combination of carriers on which the UE supports concurrent CSI measurement, and the total quantity of CSI measurements performed by the UE on all carriers on which the UE performs CSI measurement.

Alternatively, the capability of the UE for measuring CSI may include: the number of carriers on which the UE supports CSI measurement, and/or, the number of carriers on which the UE supports concurrent CSI measurement; or, the capability of the UE for measuring CSI may be as follows: one or all of the number of carriers on which the UE supports CSI measurement and the number of carriers on which the UE supports concurrent CSI measurement, and the number of CSI measurements performed on each carrier on which the UE supports CSI measurement; or, the capability of the UE for measuring CSI may be as follows: one or all of the number of carriers on which the UE supports CSI measurement and the number of carriers on which the UE supports concurrent CSI measurement, and the total quantity of CSI measurements performed on all carriers on which the UE supports CSI measurement; or, the capability of the UE for measuring CSI may be as follows: one or all of a combination of carriers on which the UE supports CSI measurement and a combination of carriers on which the UE supports concurrent CSI measurement, and the number of CSI measurements performed on each carrier on which the UE supports CSI measurement; or, the capability of the UE for measuring CSI may be as follows: one or all of a combination of carriers on which the UE supports CSI measurement and a combination of carriers on which the UE supports concurrent CSI measurement, and the total quantity of CSI measurements performed on all carriers on which the UE supports CSI measurement.

In this embodiment, further, the transmitter 1101 is further configured to: when the measurement capability indication information is the indication information indicating the capability of the UE for measuring CSI and the measurement set is a CSI measurement set, after the receiver 1102 receives a CSI measurement set notified by the base station, report channel state information with respect to carriers in the CSI measurement set to the base station, where the CSI measurement set includes a set of carriers on which the UE performs CSI measurement or the CSI measurement set includes a set of carriers on which the UE performs CSI measurement and information of a reference signal used to perform CSI measurement on each carrier on which the UE performs CSI measurement.

In the CSI measurement set, the reference signal used to perform CSI measurement on each carrier on which the UE performs CSI measurement may be configured in an independent manner or in a combined manner. The reference signal used to perform CSI measurement may include a CSI-RS and a CRS.

Further, when the measurement capability indication information is the indication information indicating the capability of the UE for measuring RSRP, the capability of the UE for measuring RSRP includes whether the UE supports measurement of CSI-RS received power; further, when the UE supports measurement of CSI-RS received power, the capability of the UE for measuring RSRP further includes the number of carriers on which the UE supports RSRP measurement; or, the capability of the UE for measuring RSRP further includes the number of carriers on which the UE supports RSRP measurement and one or a combination of the number of reference signal resources for RSRP measurement on each carrier on which the user equipment supports measurement of CSI-RS received power, the number of ports for RSRP measurement on each carrier on which the UE supports measurement of CSI-RS received power, and the number of RSRPs measured on each carrier on which the UE performs measurement of CSI-RS received power; or, the capability of the UE for measuring RSRP further includes the number of carriers on which the UE supports RSRP measurement, and one or a combination of the total number of reference signal resources and the total number of ports for RSRP measurement on all carriers on which the UE supports measurement of CSI-RS received power, and the total number of RSRPs measured on all carriers on which the UE performs measurement of CSI-RS received power.

The transmitter 1101 is further configured to: when the measurement capability indication information is the indication information indicating the capability of the UE for measuring RSRP and the measurement set is a resource management set, after the receiver 1102 receives the resource management set notified by the base station, report RSRPs with respect to carriers in the resource management set to the base station, where the resource management set includes a set of carriers on which the UE performs RSRP measurement and a reference signal used to perform RSRP measurement on each carrier on which the UE performs RSRP measurement.

In the resource management set, the reference signal used to perform RSRP measurement on each carrier on which the UE performs RSRP measurement may be configured in an independent manner or in a combined manner. The reference signal used to perform RSRP measurement includes a CSI-RS or a CRS; and the RSRP includes an RSRP based on the CSI-RS and an RSRP based on the CRS.

Further, the receiver 1102 is further configured to: after the receiver 1102 receives the resource management set notified by the base station, receive a CSI measurement set notified by the base station by using semi-static signaling or dynamic signaling, where the CSI measurement set is selected by the base station for the UE.

The resource management set may include the CSI measurement set; or the resource management set and the resource management set and the CSI measurement set have an intersection but have no inclusion relationship; or, the resource management set and the CSI measurement set have no intersection.

Further, the receiver 1102 is further configured to: after receiving the CSI measurement set, obtain an activated carrier set notified by the base station by using semi-static signaling or dynamic signaling, where the activated carrier set is selected, from the CSI measurement set, by the base station for the UE. The number of carriers in the activated carrier set is less than or equal to the number of carriers on which the UE supports concurrent receiving of data transmission.

Specifically, the receiver 1102 may obtain the activated carrier set notified by the base station by using semi-static signaling or dynamic signaling in the following manners:

Manner 1: The receiver 1102 obtains an activated carrier set in at least one subframe and notified by the base station in a pre-defined manner or by using higher layer signaling, where the at least one subframe may be pre-defined or be configured by using higher layer signaling and an activated carrier in the activated carrier set is pre-defined or be configured by using higher layer signaling; and when the activated carrier in the activated carrier set is pre-defined, the activated carrier is pre-defined as a primary carrier or a secondary carrier.

Manner 2: The receiver 1102 obtains an activated carrier after N subframes and notified by the base station by using dynamic signaling, where the activated carrier includes a primary carrier and/or a secondary carrier; and the dynamic signaling is sent by the base station by using an activated carrier, where the dynamic signaling may be as follows: downlink control information sent by the base station through a PDCCH or an ePDCCH or a PDSCH.

Manner 3: When the base station does not notify an activated carrier set of a first frame to the UE by using semi-static signaling or dynamic signaling, the activated carrier set of the first subframe is a primary carrier or an activated carrier set which is in a subframe closest to and before the first subframe and is known by the user equipment.

The foregoing three manners may be used independently or be used in combination.

In this embodiment, the receiver 1102 obtains an activated carrier set notified by the base station in one or a combination of the foregoing three manners, which may enable the UE that can support a data processing capability on only one or a few carriers to select a carrier dynamically from multiple carriers, thereby increasing throughput of the UE and optimizing network throughput.

The primary carrier is at least one carrier obtained by the UE by configuring higher layer signaling or in a pre-defined manner, where the at least one carrier is at least one of carriers on which the UE performs CSI measurement.

The secondary carrier is at least one carrier obtained by the UE by configuring higher layer signaling or in a pre-defined manner, where the at least one carrier is at least one of carriers on which the UE performs CSI measurement.

Further, the receiver 1102 is further configured to: after obtaining an activated carrier set, receive downlink control information on an activated carrier in the activated carrier set, and receive a PDSCH on the activated carrier according to the downlink control information; and/or, the receiver 1102 is further configured to: after obtaining the activated carrier set, when an activated carrier in the activated carrier set is an activated carrier after N subframes and notified by the base station by using dynamic signaling, receive downlink control information on an activated carrier on which the base station sends the dynamic signaling, and receive, according to the downlink control information, a PDCCH or an ePDCCH or a PDSCH on the activated carrier after the N subframes indicated by the dynamic signaling.

Further, the receiver 1102 is further configured to: after obtaining the activated carrier set, when the activated carrier set is an activated carrier set in at least one subframe and notified by the base station to the UE in a pre-defined manner or by using higher layer signaling, receive, on an activated carrier in the at least one subframe, one or a combination of a physical broadcast channel, a synchronization channel and a paging channel.

Further the UE in this embodiment may further include:
a processor 1103, configured to measure channel state information on an activated carrier in the activated carrier set after the receiver 1102 obtains the activated carrier set.

Further, the receiver 1102 is further configured to: after obtaining the activated carrier set, obtain a virtual activated carrier set notified by the base station in a pre-defined manner or by using semi-static signaling or dynamic signaling; and send the virtual activated carrier set to the processor 1103.

The processor 1103 is further configured to obtain a virtual activated carrier set from the receiver 1102, and measure channel state information on a virtual activated carrier in the virtual activated carrier set rather than receive a PDCCH, an ePDCCH and a PDSCH.

In the foregoing embodiment, a transmitter 1101 reports measurement capability indication information and indication information indicating a capability of receiving data transmission to a base station, and then, a receiver 1102 receives a measurement set notified by the base station, where the measurement set is selected by the base station for the UE according to the measurement capability indication information, where the measurement capability indication information includes indication information indicating a capability of the UE for measuring CSI and/or indication information indicating a capability of the UE for measuring RSRP. Then, the base station can receive the channel state information and/or the RSRP reported by the UE, select a CSI measurement set for the UE, and select, from the CSI measurement set, an activated carrier set for the UE. In this way, the base station can flexibly select an activated carrier set for the UE.

It should be noted that the UE in the present invention is one type of UE. The number of carriers on which this type of UE supports CSI measurement is greater than the number of carriers on which this type of UE supports concurrent receiving of data transmission, and/or, the number of carriers on which this type of UE supports CSI measurement is greater than the number of carriers on which this type of UE supports concurrent receiving of data transmission.

Persons skilled in the art may understand that the accompanying drawings are schematic diagrams of only one exemplary embodiment and modules or processes in the accompanying drawings may not be mandatory ones of the present invention.

Persons skilled in the art may understand that modules in the apparatus in the embodiment may be distributed in the apparatus of the embodiment according to the descriptions of the embodiments or the modules may be modified accordingly and be located in one or multiple apparatuses different from this embodiment. The modules in the foregoing embodiment may be combined into one module or be further split into multiple submodules.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, as long as such modifications or replacements do not cause the essence of corresponding technical solutions to depart from the scope of the technical solutions of the embodiments of the present invention.

What is claimed is:
1. A method for signal transmitting comprising:
reporting, by a user equipment, measurement capability indication information and indication information indicating a capability of receiving data transmission to a base station,
wherein the measurement capability indication information determines a measurement set of carriers;
receiving, by the user equipment, the measurement set from the base station;
wherein the indication information indicating the capability of receiving the data transmission comprises a quantity of carriers for which the user equipment supports concurrently receiving the data transmission, and the measurement capability indication information comprises a quantity of carriers on which the user equipment supports concurrent channel state information (CSI) measurements, and
wherein at least one carrier in the measurement set is not among the carriers in the quantity of carriers the user equipment supports for concurrently receiving the data transmission and is among the quantity of carriers on which the user equipment supports concurrent CSI; and
measuring, by the user equipment, the CSI of the measurement set of carriers; and
reporting, by the user equipment, the CSI of the measurement set of carriers.

2. The method according to claim 1, wherein:
(a) the quantity of carriers for which the user equipment supports CSI measurement is greater than the quantity of carriers for which the user equipment supports the concurrent receiving of the data transmission, and
(b) the quantity of carriers for which the user equipment supports concurrent CSI measurement is greater than the quantity of the carriers for which the user equipment supports the concurrent receiving of the data transmission.

3. The method according to claim 1, wherein the measurement set comprises one of the following:
(a) identification of at least one carrier on which the user equipment performs CSI measurement; and
(b) identification of at least one carrier on which the user equipment performs the CSI measurement and information of a reference signal used to perform the CSI measurement on each carrier on which the user equipment performs the CSI measurement.

4. The method according to claim 3, further comprising:
after the user equipment receives the measurement set, obtaining, by a processor of the user equipment, an activated carrier set from semi-static signaling or dynamic signaling sent by the base station, wherein the activated carrier set is selected from the measurement set.

5. The method according to claim 4, wherein obtaining the activated carrier set comprises at least one of following:
(a) obtaining, by the user equipment, the activated carrier set in at least one subframe and notified by the base station in a pre-defined manner or using higher layer signaling, wherein the at least one subframe is pre-defined or configured using the higher layer signaling, the activated carrier set comprises at least one activate carrier, which is pre-defined or is configured using the higher layer signaling; and
(b) obtaining, by the user equipment, an activated carrier after a plurality of subframes and notified by the base station using dynamic signaling, wherein the activated carrier comprises at least one of a primary carrier and a secondary carrier, and the dynamic signaling is sent by the base station using the activated carrier,
wherein when the base station does not notify the activated carrier set of a first subframe to the user equipment using the semi-static signaling or the dynamic signaling, the activated carrier set of the first subframe is a primary carrier or an activated carrier set which is in a second subframe closest to and before the first subframe and is known by the user equipment.

6. The method according to claim 5, wherein the dynamic signaling comprises downlink control information sent by the base station through one of the following:
a physical downlink control channel, an enhanced physical downlink control channel and a physical downlink shared channel.

7. The method according to claim 5, after obtaining the activated carrier set notified by the base station, the method further comprising at least one of following:
(a) receiving, by the receiver of the user equipment, downlink control information on an activated carrier in the activated carrier set, and receiving a physical downlink shared channel on the activated carrier according to the downlink control information; and (b) when the activated carrier in the activated carrier set is an activated carrier after a plurality of subframes and notified by the base station using the dynamic signaling,
receiving, by the receiver of the user equipment, downlink control information on an activated carrier on which the base station sends the dynamic signaling, and
receiving, according to the downlink control information, one of a physical downlink control channel, an enhanced physical downlink control channel, and a physical downlink shared channel on the activated carrier after the plurality of subframes indicated by the dynamic signaling.

8. The method according to claim 4, after obtaining the activated carrier set, the method further comprising measuring, by the processor of the user equipment, CSI on an activated carrier in the activated carrier set.

9. The method according to claim 4, after obtaining the activated carrier set, the method further comprises:
obtaining, by the processor of the user equipment, a virtual activated carrier set notified by the base station in a pre-defined manner or using the semi-static signaling or the dynamic signaling; and
measuring, by the processor of the user equipment, CSI on a virtual activated carrier in the virtual activated carrier set rather than receiving a physical downlink control channel, an enhanced physical downlink control channel and a physical downlink shared channel.

10. A user equipment comprising:
a processor configured to control a transmitter to send measurement capability indication information and indication information indicating a capability of receiving data transmission to a base station, wherein the measurement capability indication information determines a measurement set of carriers; and
a receiver configured to cooperate with the processor to receive the measurement set from the base station;
wherein the indication information indicating the capability of receiving the data transmission comprises a quantity of carriers for which the user equipment supports concurrently receiving data transmission, and the measurement capability indication information comprises a quantity of carriers on which the user equipment supports concurrent channel state information (CSI) measurements, and
wherein at least one carrier in the measurement set not among the carriers in the quantity of carriers the user equipment supports for concurrently receiving the data transmission and is among the quantity of carriers on which the user equipment supports concurrent CSI; and
the transmitter configured to cooperate with the processor to report to the base station the concurrent CSI with respect to the carriers of the measurement set.

11. The user equipment according to claim 10, wherein:
(a) the number of carriers for which the user equipment supports CSI measurement is greater than the number of carriers on which the user equipment supports the concurrent receiving of data transmission, and
(b) the number of carriers for which the user equipment supports concurrent CSI measurement is greater than the number of carriers for which the user equipment supports the concurrent receiving of data transmission.

12. The user equipment according to claim 10, wherein the measurement set comprises one of the following:

(a) identification of at least one carrier on which the user equipment performs CSI measurement, and
(b) identification of at least one carrier on which the user equipment performs the CSI measurement and information of a reference signal used to perform the CSI measurement on each carrier on which the user equipment performs the CSI measurement.

13. The user equipment according to claim 12, wherein the processor is further configured to, after the receiver receives the measurement set, obtain an activated carrier set from semi-static signaling or dynamic signaling received by the receiver from the base station, wherein the activated carrier set is selected from the measurement set.

14. The user equipment according to claim 13, wherein the processor is configured to obtain an activated carrier set by at least one of following:
(a) obtaining the activated carrier set in at least one subframe and notified by the base station in a pre-defined manner or using higher layer signaling, wherein the at least one subframe is pre-defined or configured using the higher layer signaling, the activated carrier set comprises at least one activate carrier, which is pre-defined or is configured using the higher layer signaling; and
(b) obtaining an activated carrier after a plurality of subframes and notified by the base station using the dynamic signaling, wherein the activated carrier set comprises at least one of a primary carrier and a secondary carrier, and the dynamic signaling is sent by the base station using the activated carrier;
wherein when the base station does not notify the activated carrier set of a first subframe to the user equipment using the semi-static signaling or the dynamic signaling, the activated carrier set of the first subframe is a primary carrier or an activated carrier set which is in a second subframe closest to and before the first subframe and is known by the user equipment.

15. The user equipment according to claim 14, wherein the dynamic signaling comprises downlink control information sent by the base station through one of the following: a physical downlink control channel, an enhanced physical downlink control channel, and a physical downlink shared channel.

16. The user equipment according to claim 14, wherein after receiving semi-static signaling or dynamic signaling, the receiver is further configured to implement at least one of the following:
(a) receiving downlink control information on an activated carrier in the activated carrier set, and receive a physical downlink shared channel on the activated carrier according to the downlink control information; and
(b) when the activated carrier in the activated carrier set is an activated carrier after a plurality of subframes and notified by the base station by using dynamic signaling, receiving downlink control information on an activated carrier on which the base station sends the dynamic signaling, and
receiving, according to the downlink control information, one of a physical downlink control channel, an enhanced physical downlink control channel, and a physical downlink shared channel on the activated carrier after the plurality of subframes indicated by the dynamic signaling.

17. The user equipment according to claim 13, wherein the processor is further configured to measure CSI on an activated carrier in the activated carrier set after obtaining the activated carrier set.

18. The user equipment according to claim 17, wherein the processor is further configured to:
after obtaining the activated carrier set, obtain a virtual activated carrier set which is either notified by the base station in a pre-defined manner or from the semi-static signaling or the dynamic signaling received by the receiver from the base station; and
measure the CSI on a virtual activated carrier in the virtual activated carrier set rather than controlling the receiver to receive a physical downlink control channel, an enhanced physical downlink control channel and a physical downlink shared channel.

19. A non-transitory, computer readable medium storing instructions that, when executed by a processor, cause the processor and an associated transmitter and receiver to be configured to provide the following:
report to a base station measurement capability indication information and indication information indicating a user equipment's capability of receiving data transmission, wherein the measurement capability indication information determines a measurement set of carriers;
receive the measurement set from the base station;
wherein the indication information indicating the capability of receiving the data transmission comprises a quantity of carriers for which the user equipment supports concurrently receiving the data transmission, and the measurement capability indication information comprises a quantity of carriers on which the user equipment supports concurrent channel state information (CSI) measurements, and
wherein at least one carrier in the measurement set not among the carriers in the quantity of carriers the user equipment supports for concurrently receiving the data transmission and is among the quantity of carriers on which the user equipment supports concurrent CSI;
measuring the CSI of the measurement set of carriers; and
reporting to the base station the CSI of the measurement set of carriers.

20. The non-transitory, computer-readable medium according to claim 19, wherein:
(a) the quantity of carriers for which the user equipment supports CSI measurement is greater than the quantity of carriers for which the user equipment supports the concurrent receiving of the data transmission, and
(b) the quantity of carriers for which the user equipment supports concurrent CSI measurement is greater than the quantity of the carriers for which the user equipment supports the concurrent receiving of the data transmission.

21. The non-transitory, computer readable medium according to claim 19, wherein the measurement set comprises one of the following:
(a) identification of at least one carrier on which the user equipment performs CSI measurement; and
(b) identification of at least one carrier on which the user equipment performs the CSI measurement and information of a reference signal used to perform the CSI measurement on each carrier for which the user equipment performs the CSI measurement.

* * * * *